United States Patent
Baker et al.

(10) Patent No.: US 9,339,781 B2
(45) Date of Patent: May 17, 2016

(54) POLYMER PARTICLES

(75) Inventors: Matthew Paul Baker, Carrum Downs (AU); Timothy Warren Davey, Notting Hill (AU); Brian Stanley Hawkett, Mona Vale (AU); Duc Ngoc Nguyen, Wiley Park (AU); Christopher Henry Such, Mount Eliza (AU)

(73) Assignee: The University of Sydney, New South Wales (AU)

( * ) Notice: Subject to any disclaimer, the term of this patent is extended or adjusted under 35 U.S.C. 154(b) by 0 days.

(21) Appl. No.: 14/122,700

(22) PCT Filed: May 31, 2012

(86) PCT No.: PCT/AU2012/000608
§ 371 (c)(1),
(2), (4) Date: Jul. 10, 2014

(87) PCT Pub. No.: WO2012/162742
PCT Pub. Date: Dec. 6, 2012

(65) Prior Publication Data
US 2014/0329932 A1    Nov. 6, 2014

(30) Foreign Application Priority Data
May 31, 2011    (AU) .................................. 2011902127

(51) Int. Cl.
*B01J 13/18*    (2006.01)
*B01J 13/22*    (2006.01)

(52) U.S. Cl.
CPC    *B01J 13/18* (2013.01); *B01J 13/22* (2013.01); *Y10T 428/2989* (2015.01)

(58) Field of Classification Search
CPC .......... B01J 13/18; C09C 3/10; C08F 292/00; C09D 7/125
See application file for complete search history.

(56) References Cited

U.S. PATENT DOCUMENTS

| 4,427,836 A | 1/1984 | Kowalski et al. |
| 4,594,363 A | 6/1986 | Blankenship et al. |

(Continued)

FOREIGN PATENT DOCUMENTS

| CN | 1718604 A | 1/2006 |
| CN | 101460525 A | 6/2009 |

(Continued)

*Primary Examiner* — Vickey Nerangis
(74) *Attorney, Agent, or Firm* — Banner & Witcoff, Ltd.

(57) ABSTRACT

The present invention relates to a method of preparing an aqueous dispersion of polymer encapsulated particulate material, the method comprising: providing a dispersion of the particulate material in a continuous aqueous phase, the dispersion comprising ethylenically unsaturated monomer and a stabilizer for the particulate material; and polymerizing the ethylenically unsaturated monomer by non-living free radical polymerization to form polymer that encapsulates the particulate material, thereby providing the aqueous dispersion of polymer encapsulated particulate material; wherein polymerization of the ethylenically unsaturated monomer comprises: (a) polymerizing a monomer composition that includes ionizable ethylenically unsaturated monomer so as to form a base responsive water swellable non-living polymer layer that encapsulates the particulate material; and (b) polymerizing a monomer composition that includes non-ionizable ethylenically unsaturated monomer so as to form an extensible, water and base permeable non-living polymer layer that encapsulates the base responsive water swellable polymer layer.

9 Claims, 1 Drawing Sheet

(56) References Cited

U.S. PATENT DOCUMENTS

| | | |
|---|---|---|
| 5,304,707 A | 4/1994 | Blankenship et al. |
| 7,579,081 B2 | 8/2009 | Brown |
| 2006/0009546 A1* | 1/2006 | Brown .................... 523/212 |

FOREIGN PATENT DOCUMENTS

| | | |
|---|---|---|
| EP | 1630206 A2 | 3/2006 |
| WO | 2007112503 A1 | 10/2007 |
| WO | 2011066608 A1 | 6/2011 |

* cited by examiner

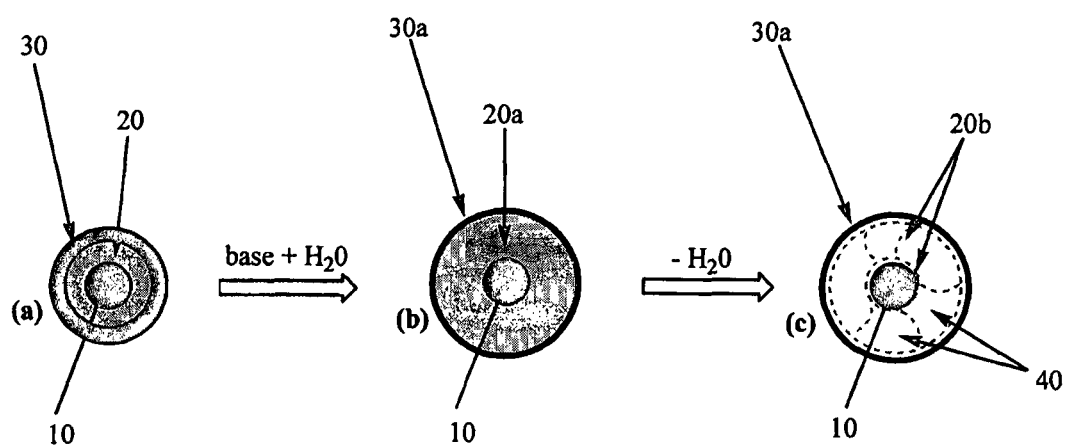

POLYMER PARTICLES

CROSS REFERENCE TO RELATED APPLICATIONS

This application is a National Stage application of co-pending PCT application PCT/AU2012/000608 filed May 31, 2012, which claims the benefit of Australian Patent Application No. 2011902127 filed May 31, 2011. These applications are incorporated herein by reference in their entireties.

FIELD OF THE INVENTION

The present invention relates in general to polymer particles. In particular, the invention relates to water swellable polymer particles, to a method of preparing the same, and to products comprising the water swellable polymer particles. The water swellable polymer particles can be used to prepare vesiculated polymer particles. The water, swellable polymer particles are particularly suited for use in coating formulations, and it will therefore be convenient to describe the invention with an emphasis toward this application. However, it is to be understood that the water swellable polymer particles may be used in various other applications.

BACKGROUND OF THE INVENTION

Water swellable polymer particles are in general known and have numerous applications. Such particles may be used as a thickening agent for aqueous media, for example as a thickening agent in aqueous coating compositions.

Water swellable polymer particles can also be used as precursors in the formation of polymer particles comprising an internal void(s). Such particles are often referred to in the art as "vesiculated polymer particles", and these too can be employed in a diverse array of applications.

For example, vesiculated polymer particles can be employed as opacifiers in coating compositions such as paints. Opacifiers are important components of paints, having the primary function of scattering light incident on an applied paint film. How well a paint film is able to visually obliterate a surface over which it is applied is referred to as its opacity. Titanium dioxide pigment is traditionally used as the main opacifier in paint formulations and it, together with the polymeric binder of the formulation, are the two main contributors to paint formulation cost. In the formulation of low sheen and flat paints, mineral extender pigments such as calcite, clay or talc are often incorporated in paint formulations to reduce specula reflection down to the desired level.

With the aim of reducing cost, mineral extenders may be added to a paint formulation at such a level that there is insufficient polymeric binder to bind (space fill) all the pigment present. The term "critical pigment volume concentration" (CPVC) is often used to describe the point where complete space filling can no longer occur. The addition of mineral extender beyond the CPVC can therefore lead to the formation of air voids in the paint film as drying occurs. These voids scatter light in their own right and contribute to paint film opacity thereby allowing an opportunity to reduce the level of titanium dioxide and still achieve acceptable opacity or coverage. The accompanying formula cost saving, however, is at the expense of other paint film properties such as scrub resistance and stain resistance. In the case of stain resistance, the problem is that of stains penetrating into the voids in the film (film porosity).

Vesiculated polymer particles have been used in paint formulations to great effect by providing voids of air in paint films without the disadvantage of film porosity. In addition to providing means to reduce the amount of titanium dioxide required in paint, the use of vesiculated polymer particles can also have the benefit of reducing the amount of polymeric binder solids required to form a well integrated paint film.

Vesiculated polymer particles are often prepared in the form of an aqueous dispersion using suspension or emulsion polymerisation techniques. When in the form of an aqueous dispersion, the voids of the particles are typically filled with water. When such a dispersion is dried, for example as part of a paint formulation applied as a film, the voids of the particles should become filled with air and thus enhance the opacifying properties of the particles.

Despite conventional vesiculated polymer particles offering improved opacifying properties relative to their non-vesiculated polymer particle counterparts, coating compositions comprising these particles still rely heavily on the opacifying properties imparted by conventional pigments such as titanium dioxide.

Accordingly, there remains scope for developing polymer particles that are suitable for use in preparing vesiculated polymer particles, the likes of which can afford improved properties such as enhanced opacity.

SUMMARY OF THE INVENTION

The present invention provides a method of preparing an aqueous dispersion of polymer encapsulated particulate material, the method comprising:

providing a dispersion of the particulate material in a continuous aqueous phase, the dispersion comprising ethylenically unsaturated monomer and a stabiliser for the particulate material; and polymerising the ethylenically unsaturated monomer by non-living free radical polymerisation to form polymer that encapsulates the particulate material, thereby providing the aqueous dispersion of polymer encapsulated particulate material;

wherein polymerisation of the ethylenically unsaturated monomer comprises:

(a) polymerising a monomer composition that includes ionisable ethylenically unsaturated monomer so as to form a base responsive water swellable non-living polymer layer that encapsulates the particulate material; and (b) polymerising a monomer composition that includes non-ionisable ethylenically unsaturated monomer so as to form an extensible, water and base permeable non-living polymer layer that encapsulates the base responsive water swellable polymer layer.

In one embodiment, the method of the invention further comprises exposing the resulting polymer encapsulated particulate material to a basic aqueous environment such that the base responsive water swellable polymer layer swells and expands in volume, while at the same time the extensible, water and base permeable polymer layer stretches to accommodate within its confines the expanded volume of the swollen base responsive water swellable polymer layer.

In another embodiment, the method of the invention further comprises removing from the polymer encapsulated particulate material water within the swollen base responsive water swellable polymer layer, the effect of which causes the volume of that layer to be reduced, wherein the extensible, water and base permeable polymer layer remains in a stretched state so as to provide one or more voids in between the particulate material and the stretched extensible, water and base permeable polymer layer.

The present invention advantageously provides an effective and efficient method of preparing particulate material encapsulated by polymer layers having properties that collectively enable the polymer encapsulated particulate material to be formed into vesiculated polymer particles where the particulate material is located within the void region.

The polymer encapsulated particulate material comprises a base responsive water swellable polymer layer (the "water swellable polymer layer"), and the water swellable layer is encapsulated by an extensible, water and base permeable polymer layer (the "extensible polymer layer"). The water swellable polymer layer can be swollen with water so as to expand in volume, with the extensible polymer layer stretching to accommodate within its encapsulating confines the expanded volume of the water swellable polymer layer.

These polymer layers surprisingly present as a substantially uniform and continuous encapsulating coating, which in turn facilitates uniform and controlled swelling of the swellable polymer layer with little, if no, rupture of the extensible polymer layer.

Removal from the polymer encapsulated particulate material of water within the swollen polymer layer causes the volume of that layer to contract or be reduced. By the extensible polymer layer remaining in a stretched state, contraction of the swellable polymer layer gives rise to the formation of one or more voids in between the core particulate material and the stretched extensible polymer layer. Such dehydration of the swollen polymer encapsulated particulate material can therefore give rise to vesiculated polymer particles.

However, unlike conventional vesiculated polymer particles, those which can be formed in accordance with the invention comprise particulate material within the void region. Locating particulate material within the void region of vesiculated polymer particles can advantageously give rise to a further interface of the particle that can participate in the scattering of light and thereby enhance the opacifying properties of the vesiculated polymer particles.

The method in accordance with the invention has been found to afford a particular efficient and effective means of producing polymer encapsulated particulate material that can be used to prepare such vesiculated polymer particles having improved opacifying properties.

The mere fact that the polymer encapsulated particulate material contains an internalised particulate material, even in the absence of a void region in between the particulate material and the extensible polymer layer, is also advantageous in its own right. Further detail in relation to this point is discussed below.

The present invention also provides polymer encapsulated particulate material, the particulate material being encapsulated by a base responsive water swellable non-living polymer layer comprising polymerised residue of ionisable ethylenically unsaturated monomer, wherein the base responsive water swellable non-living polymer layer is encapsulated by an extensible, water and base permeable non-living polymer layer that comprises polymerised residue of non-ionisable ethylenically unsaturated monomer.

In one embodiment, the base responsive water swellable non-living polymer of the polymer encapsulated particulate material is swollen with water to provide for an expanded volume of that layer, and the extensible, water and base permeable non-living polymer layer is in a stretched state to accommodate within its confines the expanded volume of the swollen base responsive water swellable non-living polymer layer.

In another embodiment, water within the swollen base responsive water swellable non-living polymer layer of the polymer encapsulated particulate material has been removed and the volume of that layer is reduced, and the extensible, water and base permeable non-living polymer layer remains in a stretched state so as to provide one or more voids in between the particulate material and the stretched, extensible, water and base permeable non-living polymer layer. In that embodiment, the polymer encapsulated particulate material may be conveniently referred to as a vesiculated polymer particle comprising particulate material within its void region.

The invention therefore also provides for vesiculated polymer particles having a water and base permeable non-living polymer layer comprising polymerised residue of non-ionisable ethylenically unsaturated monomer that encapsulates particulate material, wherein a void region located between the particulate material and the water and base permeable non-living polymer layer comprises water swellable non-living polymer comprising polymerised residue of ionisable ethylenically unsaturated monomer.

Further aspects of the invention appear below in the detailed description of the invention.

BRIEF DESCRIPTION OF THE DRAWINGS

Preferred embodiments of the invention will now be illustrated by way of example only with reference to the accompanying drawings in which:

FIG. 1 illustrates a schematic representation of polymer encapsulated particulate material in accordance with the invention.

DETAILED DESCRIPTION OF THE INVENTION

Polymer encapsulated particulate material in accordance with the invention comprises (a) a water swellable polymer layer that encapsulates the particulate material, and (b) an extensible polymer layer that encapsulates the water swellable polymer layer. By exposing the polymer encapsulated particulate material to base in an aqueous medium, the water swellable polymer layer can be triggered to swell with water and expand its volume, with the extensible polymer layer stretching so as to accommodate within its confines the expanded volume of that layer.

Removal of water from the swollen polymer layer will cause the volume of that layer to be reduced, and by maintaining the extensible polymer layer in a stretched state voids can advantageously be formed in between the now stretched extensible polymer layer and the particulate material.

These various forms of the polymer encapsulated particulate material are schematically illustrated in FIG. 1.

With reference to FIG. 1, a simplified schematic cross section of different forms of the polymer encapsulated particulate material in accordance with the invention are illustrated by parts (a), (b) and (c).

The cross section polymer encapsulated particulate material (a) in FIG. 1 shows the particulate material (10) as a core that is encapsulated by the water swellable polymer layer (20). The water swellable polymer layer is itself encapsulated by the extensible polymer layer (30). The method of the present invention provides for polymer encapsulated particulate material having such features. By exposing polymer encapsulated particulate material (a) to a basic aqueous environment, the water swellable polymer layer can be triggered to swell with water to afford polymer encapsulated particulate material (b).

The cross section of polymer encapsulated particulate material (b) in FIG. 1 again shows the particulate material (10) encapsulated by the two polymer layers. However, in this case the water swellable polymer layer is now swollen with water and has expanded in volume to form a swollen swellable polymer layer (20a). The extensible polymer layer has in turn stretched to accommodate within its confines the expanded volume of the swollen polymer layer to form a stretched extensible polymer layer (30a). Removing water from the swollen polymer layer affords polymer encapsulated particulate material (c).

The cross section of polymer encapsulated particulate material (c) in FIG. 1 shows one or more voids (40) that have formed as a result of water being removed from the swollen polymer layer and its volume being correspondingly reduced. Without wishing to be limited by theory, it is believed that the dehydrated water swellable polymer layer (20b) may form on the inner surface of the stretched extensible polymer layer (30a) and/or the outer surface of the particulate material (10). It may also be that dehydrated water swellable polymer residue extends across the void(s) between the particulate material and stretched extensible polymer layer. Irrespective of where the dehydrated water swellable polymer layer residue resides, one or more voids are advantageously formed between the particulate material and the stretched extensible polymer layer. Such polymer encapsulated particulate material may therefore be conveniently referred to as a vesiculated polymer particle. As will be appreciated from FIG. 1(c), the particulate material is advantageously located within the void region of the vesiculated polymer particle. Locating the particulate material in this manner can advantageously enhance the opacifying properties of the vesiculated polymer particle.

The void region (40) is a region within the polymer encapsulated particulate material that is no longer occupied by polymer or the particulate material. If the resulting vesiculated polymer particles form part of an aqueous solution, the void region(s) may be occupied by the aqueous media. Removal of the aqueous media from the vesiculated polymer particles will typically result in the void region(s) being occupied by ambient gas (e.g. air).

It will be appreciated that in order to maximise the impact of the void on the scattering of light by the core particle it is desirable to minimise the amount of water swellable polymer used to achieve a void of given volume. This will minimise the contribution that the water swellable polymer remaining in the void makes to the refractive index of that void and maximise the refractive index difference between the void and the core particle.

The method in accordance with the invention comprises providing a dispersion of the particulate material in a continuous aqueous phase. The dispersion may therefore be described simplistically as an aqueous phase having the particulate material dispersed therein. In this context, the term "phase" is used to convey that there is an interface between the aqueous media and the particulate material as a result of the particulate material being substantially insoluble in the aqueous media.

It will be appreciated that in isolation the aqueous phase will typically be an aqueous liquid medium. In other words, the term "phase" simply assists with describing the aqueous media when provided in the form of the dispersion. However, for convenience the aqueous media used to prepare the dispersion may hereinafter simply be referred to as the aqueous phase.

The "particulate material" used in accordance with the invention will typically be solid in composition at least at temperatures used to prepare the polymer encapsulated particulate material. Where vesiculated polymer particles are to be prepared from the polymer encapsulated particulate material, the particulate material will typically also be solid in composition in the sense that it must of course provide an interface when located within the void region of vesiculated polymer particles.

Provided that the particulate, material can be dispersed in the continuous aqueous phase, there is no particular limitation concerning its shape, size or composition. However, those skilled in the art will appreciate that particulate material having a high aspect ratio, for example those having a flat lamellar or needle shape, may prove more difficult to uniformly encapsulate with polymer than particulate material having a relatively low aspect ratio.

The particulate material may be in the form of primary particles, or in the form of an aggregation of primary particles.

Generally, the largest dimension of the particulate material (as a primary particle or aggregation of primary particles) will be no greater than about 10 microns, or no greater than about 5 microns, or no greater than about 1 micron. The method of the invention is particularly effective at preparing polymer encapsulated sub-micron particulate material, for example where the largest dimension of the particulate material is no greater than about 0.5 microns, no greater than about 0.25 microns, no greater than about 0.1 micron, no greater than about 0.01 micron, or no greater than about 0.001 micron.

Unless stated otherwise, reference herein to the size of particles or particulate material is intended to be a reference to the average largest dimension of the particles or particulate material as measured by optical microscopy for sizes above about 1 micron, and by TEM for sizes below about 1 micron.

The particulate material may be a pigment, magnetic material, fullerene, or a combination thereof.

The pigment may be an inorganic material selected from titanium oxide, zinc oxide, calcium carbonate, ion oxide, silicon dioxide, barium sulphate, carbon black and combinations thereof. The pigment may be an organic pigment such as phthalocyanine blue, phthalocyanine green, quinacridone, dibromananthrone and combinations thereof. The fullerene may be selected from carbon nanotubes, buckyballs and combinations thereof.

In one embodiment, the particulate material is non-polymeric particulate material.

In a further embodiment, the particulate material is hydrophilic in character (i.e. can be wetted by a hydrophilic liquid). Examples of such materials include, but are not limited to, titanium dioxide, zinc oxide, calcium carbonate, iron oxide, silicon dioxide, barium sulfate, and magnetic materials such as γ-iron oxide.

The particulate material is dispersed in a continuous aqueous phase. This phase will of course comprise water, but may also comprise one or more water miscible polar solvents such as ethylene and propylene glycol and low molecular weight alcohols (e.g. $C_1$-$C_3$ alcohols).

The continuous aqueous phase comprises a stabiliser for the particulate material. The "stabiliser" serves to prevent, or at least minimise coalescence or aggregation of the dispersed particulate material. The stabiliser may prevent, or at least minimise, coalescence or aggregation of the particulate material through well known pathways such as steric and/or electrostatic repulsion.

To function as a stabiliser, the stabiliser used in accordance with the invention will be capable of physically associating in some way with the outer most surface of the particulate material. For example, the physical association may be by way of the stabiliser being adsorbed onto the outer most surface of the particulate material. By having an ability to be adsorbed onto the outer most surface of the particulate material, it will be appreciated that the stabiliser will exhibit surface activity, or in another words it will be surface active.

Stabilisers used in accordance with the invention will typically be selected to be soluble in continuous aqueous phase and have a structure that enable them to (a) be preferentially adsorbed onto the outer most surface of the particulate material rather than be solvated by and present in the continuous aqueous phase, and (b) function as a stabiliser for the particulate material under the conditions of the polymerisation.

To achieve such properties, the stabilisers will generally be a polymer comprising the polymerised residues of hydrophilic monomers or hydrophilic and hydrophobic monomers. Where the stabiliser comprises the polymerised residues of hydrophobic monomers, they will not be present in an amount that renders the stabiliser insoluble in the continuous aqueous phase.

The stabilisers will typically not be capable of forming, or not form, micelle structures within the continuous aqueous phase. The property of a given stabiliser being non-micelle forming within the continuous aqueous phase can be readily determined by those skilled in the art.

The terms "hydrophilic" and "hydrophobic" are used herein to describe the character or properties of certain features of the present invention. Those skilled in the art will appreciate that these terms are typically used as an indicator of favourable or unfavourable interactions of one substance relative to another (i.e. attractive or repulsive interactions) and not to define absolute qualities of a particular substance. In other words, the terms "hydrophilic" and "hydrophobic" are used as primary indicators to define characteristics such as like attracting like and unlike repelling unlike.

Thus, it will be appreciated that hydrophilic properties or character are intended to indicate a favourable interaction (e.g. good solubility or wettability) with aqueous media, whereas hydrophobic properties or character is intended to indicate an unfavourable interaction with aqueous media (e.g. poor solubility or wettability).

Depending upon the nature of the particulate material, the continuous aqueous phase and the stabiliser, the stabiliser may exhibit a degree of lability. By the stabiliser exhibiting a degree of "lability" is meant that it can exist in equilibrium between being solvated in the continuous aqueous phase and being associated or adsorbed at the surface of the particulate material. For convenience, stabiliser that is not associated with or adsorbed to the particulate material in the continuous aqueous phase will herein be referred to as "free" stabiliser.

The presence of free stabiliser in the continuous aqueous phase can lead to the formation of independent polymer particles that do not comprise particulate material. However, the potential negative impact of this can be minimised due to the stabilisers being used not being capable of forming micelles in the continuous aqueous phase.

To further minimise the formation independent polymer particles that do not comprise particulate material, ethylenically unsaturated monomer can be introduced to the continuous aqueous phase after the particulate material and stabiliser have been combined so as to provide for a stable dispersion. By adopting this approach, the likelihood of any stabiliser also acting as a stabiliser for monomer droplets in the continuous liquid phase is reduced. It is also preferred that the monomer which is introduced to the continuous aqueous phase is done in a manner that avoids the formation of monomer droplets. In other words, it is preferred that the polymerisation is conducted under "starved feed" conditions. Such conditions also reduce the likelihood of stabilised monomer droplets being formed in the continuous aqueous phase, which in turn also reduces the possibility of forming polymer that is independent of the particulate material.

Suitable stabilisers that may be used in accordance with the invention include, but are not limited to polymers comprising the polymerised residues of hydrophilic monomers or hydrophilic and hydrophobic monomers. The hydrophilic monomer residue can be derived from ionisable monomers that provide anionic charge to the stabiliser upon being neutralised by base and dispersed in water. The hydrophilic monomer residue can also be derived from non-ionisable monomers such as hydroxyethyl methacrylates and macromonomers derived from methoxy polyethylene oxide. Examples of suitable hydrophilic and hydrophobic monomers are outlined below.

The stabilisers will generally have a number average molecular weight (Mn) of no more than about 25,000, or no more than about 20,000, or no more than about 15,000, or no more than about 10,000. For example the number average molecular weight (Mn) of the stabilisers may range from about 3,000 to about 25,000, or about 3,000 to about 20,000, or about 3,000 to about 15,000, or about 3,000 to about 10,000.

Unless otherwise stated, reference herein to a number average molecular weight (Mn) is that measured by GPC using polystyrene standards.

Suitable commercially available stabilisers include Orotan 731A (Dow Coating materials) and styrene maleic anhydride SMA 1000H (Sartomer).

The continuous aqueous phase may comprise one or more additives, such as those used to regulate or adjust pH.

The continuous aqueous phase also comprises one or more ethylenically unsaturated monomers. These monomers may present in the aqueous phase as a separate liquid phase (i.e. a separate immiscible liquid phase), or the monomers may be soluble in the aqueous phase. Further detail in relation to the monomers is outlined below.

The continuous aqueous phase may also optionally comprise an auxiliary surfactant. The type and amount of surfactant, or blend of surfactants, used should not adversely interfere with the ability of the monomers to be polymerised at the surface of the particulate material and form the encapsulating polymer layers.

Where an auxiliary surfactant is employed, it is preferably used during polymerisation of at least the first 50 wt. %, at least the first 60 wt. %, at least the first 70 wt. %, or at least the first 80 wt. % of monomers in amount below its critical micelle concentration (CMC).

As use herein the critical micelle concentration (CMC) of a surfactant is intended to mean the concentration of the surfactant in water at standard pressure and temperature above which micelles form and substantially all further added surfactant goes to forming micelles. CMC values for many surfactants are readily available. CMC values can be measured using known surface tension techniques.

Those skilled in the will appreciate that the CMC of a surfactant (as measured in water) can be lowered by the presence of other components that will often be found in a typical polymerisation process, for example other surfactants, electrolytes and unreacted monomer. The CMC of a surfactant as measured in water has been found to be a simple and useful starting point from which to gauge the concentration of an auxiliary surfactant that may be used in accordance with the invention. Nevertheless, due to lowering of a given CMC that can occur in performing the method of the present invention, in some embodiments it may be preferable to employ an auxiliary surfactant in amount that is at least 10%, 20%, 30%, or 40% lower than its CMC (as measured in water).

A variety of auxiliary surfactants known to those skilled in the art may be used in accordance with the invention and include anionic, non-ionic and cationic surfactants. Anionic surfactants are preferred because they can be introduced in a practical amount without exceeding their CMC. This is in contrast with non-ionic surfactants which generally have a lower CMC, making the ability to introduce them without exceeding their CMC more difficult.

Suitable auxiliary surfactants include alkyl sulphates, polyoxyalkylene sorbitan monooleates, arylalkylsulfonates and arylalkyphosphates.

In accordance with the method of the invention, the ethylenically unsaturated monomers are polymerised by non-living free radical polymerisation. Living polymerisation is generally considered in the art to be a form of chain polymerisation in which irreversible chain termination is substantially absent. An important feature of living polymerisation is that polymer chains will continue to grow while monomer and the reaction conditions to support polymerisation are provided. Polymerisation of the monomers according to the present invention therefore occurs by a free radical process that does not exhibit living characteristics. Those skilled in the art commonly refer to such free radical polymerisation as "conventional" free radical polymerisation. Polymerisation of the monomers is therefore not intended to embrace living free radical polymerisation techniques such as RAFT polymerisation.

According to the method of the invention there is formed by non-living free radical polymerisation (a) a water swellable polymer layer that encapsulates the particulate material, and (b) an extensible polymer layer that encapsulates the water swellable polymer layer. These polymer layers may therefore herein be referred to as (a) a base responsive water swellable non-living polymer layer ("water swellable non-living polymer layer"), and (b) an extensible, water and base permeable non-living polymer layer ("extensible non-living polymer layer"), respectively.

In accordance with the method of the invention, ethylenically unsaturated monomers are polymerised to form a polymer that encapsulates the particulate material. The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiating system is chosen such that under the reaction conditions there is no substantial adverse interaction of the initiator or the initiating radicals with any other reagents present under the conditions of the reaction.

Thermal initiators are chosen to have an appropriate half life at the temperature of polymerisation. These initiators can include one or more of the following compounds:

2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramidine), 2,2'-azobis{2-methyl-N-[1,1-bis(hydroxymethyl)-2-hydroxyethyl]propionamide}, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide)dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Photochemical initiator systems are chosen to have the requisite solubility in the reaction medium and have an appropriate quantum yield for radical production under the conditions of the polymerisation. Examples include benzoin derivatives, benzophenone, acyl phosphine oxides, and photo-redox systems.

Redox initiator systems are chosen to have the requisite solubility in the reaction medium and have an appropriate rate of radical production under the conditions of the polymerisation; these initiating systems can include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in recent texts. See, for example, Moad and Solomon "the Chemistry of Free Radical Polymerisation", Pergamon, London, 1995, pp 53-95.

Initiators having an appreciable solubility in an aqueous medium include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine)dihydrochloride, 2,2'-azobis(2-amidinopropane)dihydrochloride, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide)dihydrate, and derivatives thereof.

Initiators having an appreciable solubility in a hydrophobic medium include, but are not limited to, azo compounds exemplified by the well known material 2,2'-azobisisobutyronitrile and 2,2'-azobis(2-methylbutyronitrile). Other readily available initiators are acyl peroxides such as acetyl and benzoyl peroxide as well as alkyl peroxides such as cumyl and t-butyl peroxides. Hydroperoxides such as t-butyl and cumyl hydroperoxides may also be used.

Preferred initiators include, but are not limited to, 2,2'-azobisisobutyronitrile and 2,2'-azobis(2-methylbutyronitrile).

The composition and architecture of the polymer layers formed around the particulate material may be tailored through the selection and controlled addition of monomer. A wide range of ethylenically unsaturated monomers may be used in accordance with the method of the invention. Suitable monomers are those which can be polymerised by a free radical process. The monomers should also be capable of being polymerised with other monomers. The factors which determine copolymerisability of various monomers are well documented in the art. For example, see: Greenlee, R. Z., in Polymer Handbook 3$^{rd}$ Edition (Brandup, J., and Immergut. E. H. Eds) Wiley: New York, 1989 p II/53. Such monomers include those with the general formula (I):

where U and W are independently selected from —$CO_2H$, —$CO_2R^1$, —$COR^1$, —$CSR^1$, —$CSOR^1$, —$COSR^1$, —$CONH_2$, —$CONHR^1$, —$CONR^1_2$, hydrogen, halogen and optionally substituted $C_1$-$C_4$ alkyl or U and W form together a lactone, anhydride or imide ring that may itself be optionally substituted, where the optional substituents are independently selected from hydroxy, —$CO_2H$, —$CO_2R^1$, —$COR^1$, —$CSR^1$, —$CSOR^1$, —$COSR^1$, —CN, —$CONH_2$, —$CONHR^1$, —$CONR^1_2$, —$OR^1$, —$SR^1$, —$O_2CR^1$, —$SCOR^1$, and —$OCSR^1$;

V is selected from hydrogen, $R^1$, —$CO_2H$, —$CO_2R^1$, —$COR^1$, —$CSR^1$, —$CSOR^1$, —$COSR^1$, —$CONH_2$, —$CONHR^1$, —$CONR^1_2$, —$OR^1$, —$SR^1$, —$O_2CR^1$, —$SCOR^1$, and —$OCSR^1$;

where the or each $R^1$ is independently selected from optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted arylalkyl, optionally substituted heteroarylalkyl, optionally substituted alkylaryl, optionally substituted alkylheteroaryl, and an optionally substituted polymer chain.

The or each $R^1$ may also be independently selected from optionally substituted $C_1$-$C_{22}$ alkyl, optionally substituted $C_2$-$C_{22}$ alkenyl, optionally substituted $C_2$-$C_{22}$ alkynyl, optionally substituted $C_6$-$C_{18}$ aryl, optionally substituted $C_3$-$C_{18}$ heteroaryl, optionally substituted $C_3$-$C_{18}$ carbocyclyl; optionally substituted $C_2$-$C_{18}$ heterocyclyl, optionally substituted $C_7$-$C_{24}$ arylalkyl, optionally substituted $C_4$-$C_{18}$ heteroarylalkyl, optionally substituted $C_7$-$C_{24}$ alkylaryl, optionally substituted $C_4$-$C_{18}$ alkylheteroaryl, and an optionally substituted polymer chain.

In one embodiment, $R^1$ may be independently selected from optionally substituted $C_1$-$C_6$ alkyl.

Examples of such monomers include, but are not limited to, maleic anhydride, N-alkylmaleimide, N-arylmaleimide, dialkyl fumarate and cyclopolymerisable monomers, acrylate and methacrylate esters, acrylic and methacrylic acid, styrene, acrylamide, methacrylamide, and methacrylonitrile, mixtures of these monomers, and mixtures of these monomers with other monomers.

Other examples of useful ethylenically unsaturated monomers include the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide; N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, ethylene and chloroprene. This list is not exhaustive.

An important feature according to the method of the present invention is that polymerisation of the ethylenically unsaturated monomer gives rise to the water swellable polymer layer and the extensible polymer layer. The term "layer" used herein is intended to mean a substantially continuous coating of polymer having a discernable thickness. The term "polymer layer" therefore does not embrace a situation where a polymeric stabiliser per se associates with and stabilises particulate material in a continuous liquid phase. Thus, in that case the polymeric stabiliser per se does not provide for a substantially continuous coating of polymer having a discernable thickness.

To provide for the water swellable polymer layer, the method therefore comprises polymerising a monomer composition that includes ionisable ethylenically unsaturated monomer. This water swellable polymer layer is a base responsive, water swellable non-living polymer layer that encapsulates the particulate material.

By being "base responsive water swellable" is meant that the non-living polymer layer will, upon being exposed to a basic aqueous environment, swell with water and expand in volume. The swelling function of this polymer layer at least in part stems from the basic aqueous environment ionising the polymerised ionisable ethylenically unsaturated monomer residue that forms part of the polymer. In this context, by the polymer layer being "water swellable" is not intended to mean that polymer layer is water soluble.

Provided that the water swellable polymer layer can be triggered to swell upon being exposed to a basic aqueous environment, there is no particular limitation concerning the base that may be used to render the aqueous environment basic. Examples of bases that may be used for this purpose include alkali metal bases such as NaOH, KOH, $Na_2CO_3$ and $NaHCO_3$, ammonium hydroxide (e.g. $NH_3$ in water), alkaline earth metal bases such as Ca(OH)$_2$ or lower aliphatic (e.g. C1-C4) amines such as trimethyl amine and triethyl amine.

In some embodiments, it may be desirable to use a volatile base to trigger swelling of the swellable polymer layer. By the term "volatile" base is meant that the base is capable of evaporating from the polymer encapsulated particulate material and/or the aqueous dispersion thereof. An example of a suitable volatile base includes ammonia (i.e. as ammonium hydroxide when present in the aqueous phase).

The water swellable polymer layer also "encapsulates" the particulate material. By the water swellable polymer layer being in a form that "encapsulates" the particulate material is meant that the polymer layer substantially surrounds or coats the entire particulate material.

By the term "ionisable" ethylenically unsaturated monomer is meant ethylenically unsaturated monomer that comprises one or more functional groups that is capable of being ionised to form cationic or anionic groups. Such functional groups will generally be capable of being ionised under acidic or basic conditions through loss or acceptance of a proton. The ionisable functional groups will generally be an acid group or a basic group. For example, a carboxylic acid functional group may form a carboxylate anion under basic conditions, and an amine functional group may form a quaternary ammonium cation under acidic conditions. The functional groups may also be capable of ionised through an ion exchange process.

As is discussed in more detail below, it is important that the water swellable polymer layer is prepared using "ionisable" ethylenically unsaturated monomer. In other words, such monomers will contain one or more functional groups that are not ionised during polymerisation, but can subsequently be ionised to promote the swelling effect. It will be appreciated that if the ionisable groups were ionised during polymerisation, undesirable premature swelling would occur. Accordingly, the "ionisable ethylenically unsaturated monomer" is not intended to embrace ionised ethylenically unsaturated monomer (i.e. ethylenically unsaturated monomer comprising an ionised functional group) that will promote swelling of the swellable polymer layer during polymerisation.

Conversely, by the term "non-ionisable" ethylenically unsaturated monomer is meant that the monomer does not comprise an ionisable or ionised functional group. In particular, such monomers do not comprise acid groups or basic groups which can loose or accept a proton under acidic or basic conditions.

In order to form the base responsive water swellable non-living polymer layer, those skilled in the art will appreciate that the ionisable ethylenically unsaturated monomer used in accordance with the invention will comprise functional groups which can be ionised to form anionic groups, such as ethylenically unsaturated monomers comprising ionisable acid functional groups.

In one embodiment, the ionisable ethylenically unsaturated monomer is ethylenically unsaturated monomer comprising one or more ionisable acid functional groups.

The use of ionisable ethylenically unsaturated monomer to form base responsive water swellable polymer is known in the art. The base responsive water swellable non-living polymer layer formed in accordance with the invention can advantageously be prepared using similar monomer compositions to those used in preparing conventional base responsive water swellable polymers.

Those skilled in the art will appreciate that the amount of ionisable ethylenically unsaturated monomer that is to be used to prepare the base responsive water swellable non-living polymer layer can vary depending upon the nature of the ionisable monomer and also the nature of any co-monomer if present. For example, the water swellable polymer layer may be formed by polymerising a monomer composition comprising ionisable and non-ionisable ethylenically unsaturated monomer. In order to obtain the water swellable properties of the polymer layer it may be that less ionisable ethylenically unsaturated monomer can be used if it is copolymerised with hydrophilic non-ionisable ethylenically unsaturated monomer relative to being polymerised with hydrophobic non-ionisable ethylenically unsaturated monomer. Those skilled in the art will be able to tailor the monomer composition comprising the ionisable ethylenically unsaturated monomer accordingly so as to form a suitable base responsive water swellable non-living polymer layer.

Generally, the monomer composition that is polymerised to form the water swellable polymer layer will comprise at least about 3 wt %, or at least 5 wt %, or at least 10 wt %, or at least 15 wt %, or at least 20 wt %, or at least 25 wt %, or at least 30 wt % of ionisable ethylenically unsaturated monomer such as ethylenically unsaturated monomer comprising one or more ionisable acid functional groups. In one embodiment, the monomer composition that is polymerised to form the water swellable polymer layer will comprise from about 10 wt % to about 40 wt %, or about 15 wt % to about 35 wt %, of ionisable ethylenically unsaturated monomer such as ethylenically unsaturated monomer comprising one or more ionisable acid functional groups.

By providing the water swellable polymer layer with a higher ionisable ethylenically unsaturated monomer (e.g. ethylenically unsaturated monomer comprising one or more ionisable acid functional groups) content, the layer can have a greater capacity to swell, and thereby less polymer can be employed to afford a given void volume.

In one embodiment, the monomer composition that is polymerised to form the water swellable polymer layer comprises methyl methacrylate (MMA), butyl acrylate (BA) and methacrylic acid (MA) and/or acrylic acid (AA), for example in a 1 (MA):1(BA):1 (MA and/or AA) weight ratio. If a combination of methacrylic acid and acrylic acid is employed, the combined mass of the two acids is to be used in calculating the required weight ratio.

Those skilled in the art will be able to select suitable hydrophilic, hydrophobic, ionisable, and non-ionisable ethylenically unsaturated monomers for use in accordance with the invention.

Examples of hydrophilic ethylenically unsaturated monomers include, but are not limited to, acrylic acid, methacrylic acid, hydroxyethyl methacrylate, hydroxypropyl methacrylate, acrylamide and methacrylamide, hydroxyethyl acrylate, N-methylacrylamide, dimethylaminoethyl methacrylate, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid, maleic acid, sulfoethyl (methacrylates), acrlamdo-2-methyl propanesulfonic acid, and phosphoethyl acrylate Examples of hydrophilic ethylenically unsaturated monomers which have ionisable acid functional groups include, but are not limited to, methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid.

Examples of non-ionisable hydrophilic ethylenically unsaturated monomers include, but are not limited to, hydroxy ethyl methacrylate, hydroxy propyl methacrylate, and hydroxy ethyl acrylate.

Examples of (non-ionisable) hydrophobic ethylenically unsaturated monomers include, but are not limited to, styrene, alpha-methyl styrene, butyl acrylate, butyl methacrylate, amyl methacrylate, hexyl methacrylate, lauryl methacrylate, stearyl methacrylate, ethyl hexyl methacrylate, crotyl methacrylate, cinnamyl methacrylate, oleyl methacrylate, ricinolyl methacrylate, vinyl butyrate, vinyl tert-butyrate, vinyl stearate and vinyl laurate.

Polymerisation of the ethylenically unsaturated monomer also comprises polymerising a monomer composition that includes non-ionisable ethylenically unsaturated monomer so as to form an extensible, water and base permeable non-living polymer layer that encapsulates the water swellable non-living polymer layer.

The hydrophobic ethylenically unsaturated monomers will generally be relatively insoluble in the aqueous phase used in accordance with the invention, whereas the hydrophilic ethylenically unsaturated monomers will generally be relatively soluble in the aqueous phase used in accordance with the invention.

The extensible polymer layer also "encapsulates" the water swellable polymer layer. By the extensible polymer layer being in a form that "encapsulates" the water swellable polymer layer is meant that the polymer substantially surrounds or coats the entire water swellable polymer layer.

As described herein, the function of the extensible layer is to first encapsulate the water swellable polymer layer in its non-swollen state and then stretch to accommodate the volume expansion of the water swellable polymer layer in its swollen state. Upon dehydration of the swollen polymer layer, the extensible polymer layer is to remain in a stretched state so as to promote formation of one or more voids between the particulate material and the extensible polymer layer.

The extensible polymer layer is also base and water permeable. Such properties are of course required to enable base and water to penetrate this layer to interact with and promote swelling of the water swellable polymer layer.

The base and water permeable properties of the extensible polymer layer may, be attained by any suitable means. Those skilled in the art will be able to select a suitable monomer composition to provide the extensible polymer layer with a sufficient degree of water and base permeability to function as required in the present invention. For example, a person skilled in the art will appreciate that the nature of the extensible polymer may vary depending on the type of base that is to be used to trigger swelling of the swellable polymer layer.

Thus, the monomer composition that is polymerised to form the extensible polymer layer may comprise hydrophilic ethylenically unsaturated monomer which can impart some hydrophilic character, to the layer and facilitate transportation of base and water therethrough. Such a composition may be useful where a fixed or non volatile base such as NaOH is being used.

Generally, the monomer composition that is polymerised to form the extensible polymer layer will comprise a majority of hydrophobic ethylenically unsaturated monomer (e.g. greater than about 50 wt %, greater than about 70 wt %, greater than about 80 wt %, or greater than about 90 wt %). The hydrophobic ethylenically unsaturated monomer will generally be non-ionisable.

In a similar manner to that discussed above in respect of the water swellable polymer layer, the amount (if present) of hydrophilic ethylenically unsaturated monomer that is polymerised to facilitate base and water permeability properties of the extensible polymer layer may vary depending upon the nature of the hydrophilic ethylenically unsaturated monomers and also on the nature of any hydrophobic ethylenically unsaturated comonomers they are polymerised with it.

Generally, the monomer composition that is polymerised to form the extensible polymer layer will comprise no more than about 10 wt %, no more than about 7 wt %, no more than about 5 wt %, or no more than about 3 wt % of hydrophilic ethylenically unsaturated monomer such as ionisable ethylenically unsaturated monomer (e.g. ethylenically unsaturated monomer comprising ionisable acid functional groups).

Unlike the water swellable polymer layer, the extensible polymer layer will generally not have water swellable properties. In other words, the extensible polymer layer will generally be substantially non water-swellable. By being "substantially non water-swellable" is meant that while the extensible polymer layer is water permeable, water is not retained within the layer to an extent that results in an appreciable expansion of its volume.

Accordingly, the polymer composition that is polymerised to form the extensible polymer layer will generally be formulated such that it does not contain an amount of ionisable ethylenically unsaturated monomer that would provide the resulting polymer with base responsive water swellable properties.

In the context of the extensible polymer layer, the term "extensible" is extended to mean that the polymer layer is capable of stretching to accommodate within its confines an expanded volume of the water swellable polymer layer when in a swollen state.

In addition to being extensible, the extensible polymer layer, when in its stretched state due to accommodating the expanded volume of the water swellable polymer layer, should also be capable of being maintained in a stretched, state upon dehydration of the swollen polymer layer. In particular, by the extensible polymer layer being maintained in a stretched state (i.e. presenting an internal perimeter that is larger than the internal perimeter of the layer in its unstretched state), a reduction in the volume of the swollen polymer layer due to dehydration can promote formation of one or more voids in between the particulate material and the extensible polymer layer. When in the stretched state, the extensible polymer layer will preferably resist deformation so as to avoid collapse of the one or more voids formed upon dehydration of the swellable polymer layer.

When the extensible polymer, layer is in a stretched state, it may no longer be extensible. In the context of the vesiculated polymer particles per se, it may therefore be convenient to simply refer to this layer simply as a water and base permeable non-living polymer layer.

Those skilled in the art will be able to prepare suitable monomer compositions that give rise to the required properties of the extensible polymer layer. For example, as discussed above the base and water permeability of the polymer layer may be derived through use of hydrophobic ethylenically unsaturated monomer optionally in conjunction with hydrophilic ethylenically unsaturated monomer.

The extensible properties of the polymer layer may be derived through selection of monomers that give rise to a (co)polymer having an appropriate glass transition temperature (Tg). Those skilled in the art will appreciate that monomers selected to form a particular polymer will influence its Tg. The "Tg" is in a range of temperature over which an amorphous polymer (or the amorphous regions in a partially crystalline polymer) change from a relatively hard and brittle state to a relatively soft, viscous or rubbery state. The Tg of the extensible polymer layer can therefore be conveniently tailored through selection of appropriate monomers.

Tg values referred to herein are calculated, and those relating to a copolymer are calculated in accordance with the Fox equation ($1/Tg=W_a/Tg_{(a)} + W_b/Tg_{(b)} + \ldots$ (where $W_a$ is the weight fraction of monomer a, $W_b$ is the weight fraction of monomer b ...)).

In one embodiment, the monomer composition that is polymerised to form the extensible polymer layer provides for an extensible polymer layer having a Tg of greater than about 50° C., or greater than about 60° C., or greater than about 70° C.

The Tg of the extensible polymer layer can advantageously be tailored to assist with attaining both the ability for the layer to stretch and also be maintained in a stretched state. For example, swelling of the water swellable polymer layer may be conducted at a temperature above the Tg of the extensible polymer layer, thereby providing the extensible polymer layer with a greater ability to stretch. The resulting polymer, encapsulated particulate material with the swollen polymer layer and the stretched extensible polymer layer may then be cooled to a temperature below the Tg of the extensible polymer layer, thereby providing the extensible polymer layer with a greater ability to resist deformation. Dehydration of the swollen polymer layer at temperatures below the Tg of the extensible polymer layer can in turn facilitate formation of one or more voids between the particulate material and the extensible polymer layer with little or no deformation of the extensible polymer layer.

In one embodiment, the monomer composition that is polymerised to form the extensible polymer layer consists essentially of styrene.

In another embodiment, the monomer composition that is polymerised to form the extensible polymer layer comprises styrene, methyl methacrylate and butyl acrylate, for example in a weight ratio of about 60:40:5.

General techniques and equipment used in performing conventional emulsion and mini-emulsion polymerisation can advantageously be employed in performing the method of the invention.

Those skilled in the art will appreciate that in order to form the water swellable polymer layer that encapsulates the particulate material, and the extensible polymer layer that encapsulates the water swellable polymer layer, polymerisation of the appropriate monomer compositions will necessarily occur sequentially. Thus, the monomer composition that gives rise to the water swellable polymer layer will be polymerised before the monomer composition that gives rise to the extensible polymer layer. These monomer compositions may be polymerised in separate discrete polymerisation reactions or may form part of a sequential continuous polymerisation process.

Generally, polymerisation of monomers to form the polymer encapsulated particulate material will be conducted in an aqueous medium having a pH that is sufficiently acidic (e.g. at a pH of less than 7, or less than 6 or less than 5, or at about 4) so as to promote little if no swelling of the so formed water swellable polymer layer. Swelling of the water swellable polymer layer will generally be performed as a separate step after the polymer encapsulated particulate material in accordance with the invention is prepared.

The method of the invention requires that the particulate material be initially encapsulated by the water swellable polymer layer. The resulting water swellable polymer layer contains ionisable groups that will generally not be ionized during the encapsulation process but are instead ionized, by changing the pH, when it is desired to swell the water swellable polymer layer. At the same time it will generally be important that there be enough charge maintained on the surface of the particulate material to maintain its colloidal stability. For robust colloid stability a zeta potential of less than about −40 is generally preferred.

During the encapsulation stage of the method, the pH should be kept high enough that there is sufficient charge on the surface of the particulate material that they remain stable (i.e. remain dispersed). In the simplest case, the stabilising charge can be maintained by conjugate bases of strong acids such as sulfonate or sulphate groups, whereas the groups that are to be ionized during the swelling stage might be weak acid groups such as carboxylic acid groups. Under these circumstances, the formation of the water swellable polymer layer can be carried out at a pH less than the pKa of the carboxylic acid groups. If carboxylic acid groups are used to both assist with maintaining the stability of the dispersion and to provide the ionisable groups (i.e. the groups that are subsequently ionized to, promote swelling), the polymerisation can be carried out at a pH that allows enough groups to be ionized to afford stability without adversely swelling the water swellable polymer layer. The precise pH to use under these circumstances will to some extent be determined by the total number of acid groups present and the proportion of these that are required to be ionized to maintain the stability colloidal of the system, the likes of which can be readily determined by those skilled in the art.

Where carboxylic acid groups are used to both assist with maintaining stability of the dispersion and to provide the ionisable groups, it may be necessary to more carefully control the pH in order to both maintain stability and avoid undesirably triggering swelling of the swellable polymer layer. Typically, the pH during formation of the encapsulating swellable polymer will not fall below about 4-4.5. The sensitivity of this pH control can advantageously be tempered through use of an anionic or non-ionic auxiliary surfactant such as alkyl sulphates (e.g. sodium dodecyl sulphate (SDS)). The auxiliary surfactant will generally be used in amount that does not exceed its CMC as herein described. Alternatively, as alluded to above, the monomer feed may comprise sulfur acid containing monomer.

Prior to commencing polymerisation to for the swellable polymer layer, the pH of the continuous aqueous phase is likely to range form between about 6 and about 7.5. As the monomer composition which forms the water swellable polymer layer is fed to the reactor, the pH of the continuous aqueous phase will begin to fall. Preferably, the pH of the continuous aqueous phase is less than 7, or less than 6 or less than 5, or at about 4 by the time no more than about 60 wt. %, no more than about 40 wt. %, or no more than about 20 wt. % of the monomer composition used to prepare the water swellable polymer layer has been introduced.

In one embodiment, the pH of the continuous aqueous phase is not less than about 5, or less than about 4.5, or less than about 4, during polymerisation of the monomer composition used to prepare the water swellable polymer layer.

In another embodiment, the pH of the continuous aqueous phase, is not less than about 5, or less than about 4.5, or less than about 4, during polymerisation of the monomer composition used to prepare the water swellable polymer layer or the extensible polymer layer.

In a further embodiment, the pH of the continuous aqueous phase is not less than about 5, or less than about 4.5, or less than about 4, at any stage during polymerisation of the monomer compositions used to prepare the polymer encapsulated particulate material.

In another embodiment, the pH of the continuous aqueous phase is not less than about 5, or less than about 4.5, or less than about 4, at any stage during preparing the polymer encapsulated particulate material.

The method in accordance with the invention will generally be performed in semi-continuous or continuous modes.

Semi-continuous and continuous modes of operation offer superior control over polymer architecture together with control over polymer polydispersity. According to these modes of operation, monomer may be added gradually or in stages thereby enabling different monomers and additives to be introduced during the course of the polymerisation reaction. As the solid content of the dispersion increases during polymerisation, the resulting polymer encapsulated particulate material may require further stabilisation. In that case, additional stabiliser may also be added to the reaction with the monomer in order to replenish the surface of the growing polymer particles with stabilising moieties.

By "semi-continuous" is meant that the method is conducted batch wise and monomer is added gradually or in stages throughout the polymerisation. By "continuous" is meant that the method is performed in a loop type reactor whereby all reagents are continuously added gradually or in stages throughout the polymerisation and product is continuously removed from the reaction system. Generally, the method will be performed in a semi-continuous mode.

An example of performing the method of the invention in a semi-continuous mode might comprise introducing a selected particulate material and stabiliser to an aqueous phase in a reaction vessel to provide for a stable dispersion of the particulate material throughout the continuous aqueous phase. A thermal initiator may also be added, along with any other reagents if required, for example buffers to regulate pH. Typically, all reagents used are essentially free from dissolved oxygen and the reaction solution is purged with an inert gas, such as nitrogen, prior to initiating the polymerisation. The dispersion temperature may then be increased so that the initiator undergoes thermally induced homolytic scission. A monomer composition that will provide for the water swellable polymer layer may then be introduced and polymerisation of the monomer composition can proceed by non-living polymerisation. The addition of monomer at this stage may be maintained at a rate to avoid reservoir monomer droplets from forming. Monomer can be added either continually or in stages until the desired degree of polymerisation has occurred so as to form the water swellable polymer layer that encapsulates the particulate material. The polymerisation process is then continued by non-living polymerisation by introducing a monomer composition that gives rise to the extensible polymer layer possibly in conjunction with additional thermal initiator. Again the monomer may be introduced continually or in stages until the desired degree of polymerisation has occurred to form the extensible polymer layer encapsulating the water swellable polymer layer.

Where the polymer encapsulated particulate material prepared in accordance with the invention is to be used as a precursor in the formation of vesiculated polymer particles, it will generally be an important consideration that the extensible polymer layer be capable of being maintained in a stretched state, and in that state resist deformation during dehydration of the swollen polymer layer so as to facilitate formation of the void region in the vesiculated polymer particles.

As discussed above, the Tg of the extensible polymer layer can be advantageously tailored to afford the extensible polymer layer with such properties. However, it may, for example, be desirable to use a monomer composition that gives rise to an extensible polymer layer having a Tg that does not afford the extensible polymer layer with adequate ability to maintain its stretched state and/or resist defamation in that stretched state (e.g. where the polymer layer has a quite low Tg). In that case, it may be desirable to introduce a degree of crosslinking into the extensible polymer layer. Introducing a degree of crosslinking into the extensible polymer layer will generally have the effect of rendering the layer less extensible and more resistant to deformation. Accordingly, it will be appreciated that such crosslinking will typically be introduced when the layer is already in a stretched state (i.e. when the water swellable polymer layer is in a swollen state).

It may also be desirable to introduce a degree of crosslinking into the extensible polymer layer irrespective of its Tg.

Accordingly, in one embodiment the method of the invention further comprises crosslinking the stretched extensible, water and base permeable non-living polymer layer that accommodates within its confines the expanded volume of the swollen base responsive water swellable non-living polymer layer.

Crosslinking of the stretched extensible polymer layer may be achieved by any suitable means known to those skilled in the art. In particular, those skilled in the art will appreciate that crosslinked polymer structures may be derived in a number of ways through use of polymerised ethylenically unsaturated monomers. For example, multi-ethylenically unsaturated monomers can afford a crosslinked polymer structure through polymerisation of at least two unsaturated groups to provide a crosslink. In that case, the crosslinked structure is typically derived during polymerisation and provided through a free radical reaction mechanism.

Alternatively, the crosslinked, polymer structure may be derived from ethylenically unsaturated monomers which also contain a reactive functional group that is not susceptible to taking part in free radical reactions (i.e. "functionalised" unsaturated monomers). In that case, the monomers are incorporated into the polymer backbone through polymerisation of the unsaturated group, and the resulting pendant functional group provides means through which crosslinking may occur. By utilising monomers that provide complementary pairs of reactive functional groups (i.e. groups that will react with each other), the pairs of reactive functional groups can react through non radical reaction mechanisms to provide crosslinks. Formation of such crosslinks may occur during or after polymerisation of the monomers.

A variation on, using complementary pairs of reactive functional groups is where the monomers are provided with non-complementary reactive functional groups. In that case, the functional groups will not react with each other but instead provide sites which can subsequently be reacted with a crosslinking agent to form the crosslinks. It will be appreciated that such crosslinking agents will be used in an amount to react with substantially all of the non-complementary reactive functional groups. Formation of the crosslinks under these circumstances will generally be induced after polymerisation of the monomers.

A combination of these methods of forming a crosslinked polymer structure may be used.

The terms "multi-ethylenically unsaturated monomers" and "functionalised unsaturated monomers" mentioned above can conveniently and collectively also be referred to herein as "crosslinking ethylenically unsaturated monomers" or "crosslinking monomers". By the general expression "crosslinking ethylenically unsaturated monomers" or "crosslinking monomers" is meant an ethylenically unsaturated monomer through which a crosslink is or will be derived. Accordingly, a multi-ethylenically unsaturated monomer will typically afford a crosslink during polymerisation, whereas a functionalised unsaturated monomer can provide means through which a crosslink can be derived either during or after polymerisation. It will be appreciated that not all unsaturated monomers that contain a functional group will be used in accordance with the invention for the purpose of functioning as a crosslinking monomer. For example, acrylic acid should not be considered as a crosslinking monomer unless it is used to provide a site through which a crosslink is to be derived.

Examples of suitable multi-ethylenically unsaturated monomers that may be selected to provide the crosslinked polymer structure include, but are not limited to, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol(meth)acrylamide, triallylamine, oleyl maleate, glyceryl propoxy triacrylate, allyl methacrylate, methacrylic anhydride and methylenebis(meth)acrylamide.

Examples of suitable ethylenically unsaturated monomers which contain a reactive functional group that is not susceptible to taking part in free radical reactions include, but are not limited to, acetoacetoxyethyl methacrylate, glycidyl methacrylate, N-methylolacrylamide, (isobutoxymethyl)acrylamide, hydroxyethyl acrylate, t-butyl-carbodiimidoethyl methacrylate, acrylic acid, γ-methacryloxypropyltriisopropoxysilane, 2-isocyanoethyl methacrylate and diacetone acrylamide.

Examples of suitable pairs of monomers mentioned directly above that provide complementary reactive functional groups include N-methylolacrylamide and itself, (isobutoxymethyl)acrylamide and itself, γ-methacryloxypropyltriisopropoxysilane and itself, 2-isocyanoethyl methacrylate and hydroxyethyl acrylate, and t-butyl-carbodiimidoethyl methacrylate and acrylic acid.

Examples of suitable crosslinking agents that can react with the reactive functional groups of one or more of the functionalised unsaturated monomers mentioned above include, but are not limited to, amines such as hexamethylene diamine, ammonia, methyl amine, ethyl amine, Jeffamines™ and diethylene triamine, melamine, trimethylolpropane tris (2-methyl-1-aziridine propionate) and adipic bishydrazide. Examples of pairs of crosslinking agents and functionalised unsaturated monomers that provide complementary reactive groups include hexamethylene diamine and acetoacetoxyethyl methacrylate, amines such as hexamethylene diamine, ammonia, methyl amine, ethyl amine, Jeffamines™ and diethylene triamine and glycidyl methacrylate, melamine and hydroxyethyl acrylate, trimethylolpropane tris(2-methyl-1-aziridine propionate) and acrylic acid, adipic bishydrazide and diacetone acrylamide.

For avoidance of any doubt, reference herein to "crosslinking" the stretched extensible polymer layer is intended to mean that polymer chains that make up the stretched extensible polymer layer are crosslinked.

Upon forming the aqueous dispersion of polymer encapsulated particulate material in accordance with the invention, the water swellable layer of the polymer encapsulated particulate material may be triggered to swell with water by exposing the polymer encapsulated particulate material to a basic aqueous environment. This will generally be done by simply introducing a suitable base to the aqueous dispersion and optionally heating the dispersion.

Upon forming the resulting swollen polymer encapsulated particulate material, if desired the method of the invention may further comprise a step of crosslinking the stretched extensible polymer layer as herein described.

In order for the resulting non-living polymer to form around and encapsulate the surface of the particulate material it will be necessary to conduct the polymerisation under conditions whereby the locus of polymerisation is predominantly occurring at the surface region of the particulate material. The use of micelle forming surfactants and the choice of reaction conditions can promote the formation of micelles in the continuous aqueous phase and introduce competition for the available monomer. If this competition for monomer is dominated by the micelles, encapsulation of the particulate material can be restricted, incomplete or even catastrophic colloidal instability can occur.

Attempts to carry out layered encapsulation of particulate material by conventional emulsion or suspension polymerisation techniques have to date been unsuccessful. Emulsion polymerisation typically involves the inclusion of low molecular weight surfactants which can readily form micelles within the continuous aqueous phase. As the polymerisation proceeds, the resulting micelles become embryonic polymer particles (without encapsulated particulate material) which dominate the polymerisation process. The embryonic polymer particles quickly become significantly more numerous than the number of particulate material particles to be encapsulated and polymerisation at their surface is substantially prevented.

The competition for monomer can also result in competition for available surfactant and stabiliser, the effect of which can result in catastrophic colloidal instability long before the polymerisation is completed.

The size of polymer particles generated from the embryonic polymer particles will typically be in the order of about 100-200 nm, which are simply too small to accommodate a single primary particulate material such as a $TiO_2$ pigment (about 250 nm). It may well be possible to reduce the size of the particulate material in the hope it may become encapsulated in such an embryonic polymer particle, but this would in turn reduce the opacifying properties of the particulate material.

Conversely, suspension polymerisation techniques typically involve the formation of monomer droplets much larger than single primary particulate material such as a $TiO_2$ pigment (about 250 nm). Monomer droplets several microns in diameter are quite common. In that case, many particles can reside in the monomer droplets and there is little or no opportunity to conduct sequential polymerisation steps leading to the required layered polymer structures according to the present invention.

The stabiliser used in accordance with the present invention will generally be a polymer soluble in the continuous aqueous phase and have an affinity to the surface of the particulate material selected. The Mn of such polymeric stabilisers is most preferably in the range of 3,000-10,000. High molecular weight stabilisers can tend to function more like a flocculent and promote precipitation by bridging across two or more adjacent particulate materials.

Use of an auxiliary surfactant can be tolerated provided it is used in an amount below its CMC from the start of the polymerisation through to at least more than 50% of the monomers to be polymerised has been polymerised.

The presence of auxiliary surfactant during the polymerisation can lead to the formation of micelles which in turn can support the formation of polymer particles that do not include the particulate material encapsulated therein (for convenience referred to "isolated" polymer particles).

Formation of isolated polymer particles can also be favoured by using high levels of polymerisation initiators which result in the formation of charged end groups on the resulting polymer chains. An initiator such as ammonium persulfate is a common initiator used in emulsion polymerisation which delivers anionic sulphate groups to the end of the resulting polymer chains. Single additions of such an initiator or a feed of concentrated initiator early in the polymerisation should be avoided or suitably adjusted if the formation of isolated polymer particles becomes excessive.

The formation of isolated polymer particles can be tolerated in some applications. However, it is preferred that greater than 50%, greater than 60%, or greater than 70% of the polymer formed should be associated with the surface of the particulate material.

Polymer formed to encapsulate the particulate material will in general be a composition derived from a mixture of hydrophilic and hydrophobic monomers. The formation of isolated polymer particles can also be undesirably favoured by the addition of high levels of hydrophilic monomer. Enriched hydrophilic feeds should therefore be carefully controlled in terms of their rate of addition, particularly at early stages of the polymerisation.

The aqueous dispersion of swollen polymer encapsulated particulate material can advantageously be used in a number of applications, including water borne coating products.

Aqueous dispersions of polymer particles are used extensively in water borne products such as paints, adhesives, fillers, primers, liquid inks and sealants. Such products also typically comprise other formulation components such as pigments, extenders, film forming aids and other additives, all present at different levels and in different combinations.

The use of pigments in such products is important not only in providing "hiding" power to the product but also to enable the products to be provided in a variety of colours.

Pigments have traditionally been incorporated in waterborne products by adding the pigments to a preformed aqueous dispersion of polymer particles and dispersing them with the assistance of dispersing agents. Alternatively, pigments are dispersed with the aid of dispersing agents in an initial stage to form what is termed a millbase, and then this millbase is blended with a preformed aqueous dispersion of polymer particles. The dispersion step requires high agitation speeds in order to impart shear on the pigment particles. This dispersion step can sometimes be problematic because conventional aqueous dispersions of polymer particles are not always stable at the levels of shear exerted during pigment dispersion.

In many applications where such pigmented products are used, agglomeration of pigment particles, in the product per se and also during curing of the product, can adversely effect properties such as the products gloss, scrub/stain resistance, flow, mechanical properties, opacity, colour and/or colour strength. Whilst being particularly desirable, reducing or avoiding detrimental agglomeration of pigment particles in such products has to date been difficult to achieve using conventional technology.

The polymer encapsulated particulate material in accordance with the invention can advantageously function as an opacifier in the aforementioned water borne coating products and therefore enable the pigment content of the products to be reduced. By incorporating particulate material within the polymer particles as herein described, the polymer encapsulated particulate material in accordance with the invention can also be used to minimise, if not eliminate, problems such as pigment agglomeration in such products.

As discussed above, dehydration of the swollen polymer encapsulated particulate material in accordance with the invention provides for vesiculated polymer particles comprising the particulate material within their void region. Such vesiculated polymer particles can advantageously exhibit enhanced opacifying properties over conventional vesiculated polymer particles. In the context of water borne coating products, the vesiculated polymer particles can simply be formed by formulating the products with the aforementioned swollen polymer encapsulated particulate material, applying the coating product as required and allowing water within the swollen polymer encapsulated particulate material to evaporate.

Providing the extensible polymer layer with a relatively high Tg (e.g. greater than about 50° C., or greater than about 60° C., or greater than about 70° C.) can facilitate separation of the so formed polymer encapsulated particulate material from the aqueous phase in which it is prepared. The polymer encapsulated particulate material can then be dried and subsequently used as an additive in waterborne or solvent borne coating compositions. For example, the isolated polymer encapsulated particulate material can be dispersed in a waterborne coating composition to impart opacifying properties to the composition.

The polymer encapsulated particulate material in accordance with the invention is of course not limited to use in water borne coating applications.

The invention therefore also provides a method of preparing a paint, filler, adhesive, liquid ink, primer or sealant product comprising preparing an aqueous dispersion of polymer encapsulated particulate material in accordance with the invention, and combining the dispersion with one or more formulation components.

Those skilled in the art will have an understanding of suitable formulation components that may be included in paints, fillers, adhesives, liquid ink, primers or sealants products. Example of such formulation components include, but are not limited to, thickeners, antifungal agents, UV absorbers, extenders and tinting agents.

The invention further provides a paint, filler, adhesive, primer or sealant product comprising an aqueous dispersion of polymer encapsulated particulate material in accordance with the invention.

The polymer encapsulated particulate material in accordance with the invention is believed to be unique in its own right and represents a further aspect of the invention.

Thus, there is also provided polymer encapsulated particulate material, that particulate material being encapsulated by a base responsive water swellable non-living polymer layer comprising polymerised residue of ionisable ethylenically unsaturated monomer, wherein the base responsive water swellable non-living polymer layer is encapsulated by an extensible, water and base permeable non-living polymer layer that comprises polymerised residue of non-ionisable ethylenically unsaturated monomer.

The features of the method described herein give rise to the polymer encapsulated particulate material according to the invention. For example, where according to the method reference is made to using a particular monomer composition, it will be appreciated that the polymer encapsulated particulate material will correspondingly comprise the polymerised residue(s) of that monomer composition.

Thus, the water swellable non-living polymer layer may comprise the polymerised residue of at least about 3 wt %, or at least 5 wt %, or at least 10 wt %, or at least 15 wt %, or at least 20 wt %, or at least 25 wt %, or at least 30 wt % of ionisable ethylenically unsaturated monomer such as ethylenically unsaturated monomer comprising one or more ionisable acid functional groups. In one embodiment, the water swellable non-living polymer layer comprises the polymerised residue of from about 10 wt % to about 40 wt %, or about 15 wt % to about 35 wt %, of ionisable ethylenically unsaturated monomer such as ethylenically unsaturated monomer comprising one or more ionisable acid functional groups.

And further, the water swellable non-living polymer layer may comprise the polymerised residue of methyl methacrylate (MMA), butyl acrylate (BA) and methacrylic acid (MA) and/or acrylic acid (AA), for example in a 1 (MMA):1(BA):1 (MA and/or AA) weight ratio. If a combination of methacrylic acid and acrylic acid is employed, the combined mass of the two acids is to be used in calculating the required weight ratio.

The polymer encapsulated particulate material can advantageously be prepared in a variety of sizes, but will generally be 20 microns or less in size. The polymer encapsulated particulate material may also be 12 microns or less, 7 microns or less, or 2 microns or less in size. The size of the polymer encapsulated particulate material may also be in sub-micron range, for example from 0.01 to 1 micron.

For avoidance of any doubt, reference to the "size" of the polymer encapsulated particulate materials is that of the average largest dimension provided by the combination of the polymer coating and the particulate material. The water swellable polymer layer will generally encapsulate the particulate material in a substantially uniform continuous coating, and the extensible polymer layer will generally encapsulate the water swellable polymer layer in a substantially uniform and continuous coating. By a "substantially uniform and continuous coating" is meant that the coating does not present in an irregular manner and that the coating is substantially free of holes or voids. In this context, it will be appreciated that reference to the coating being substantially "free of holes or voids" is intended to be a reference to at least the water swellable polymer layer that has not undergone swelling and subsequent dehydration so as to provide for the vesiculated polymer particles described herein.

To achieve the substantially uniform continuous coating of the layers, the thickness of the layers will generally be relatively constant. However, it may be that the thickness of one or both of the encapsulating polymer layers vary gradually around the perimeter of the particulate material. For example, the particulate material may not be located at the precise centre of a spherical polymer coating. An assessment of the uniformity, continuity, and thickness of the polymer layers will generally be made visually, for example by TEM.

While there is no particular limitation as to the thickness of the water swellable polymer layer that encapsulates the particulate material or the extensible polymer layer that encapsulates the water swellable polymer layer, the layers will generally have a thickness that enables them to function in the manner described herein. Thus, the water swellable polymer layer will generally have a thickness that enables it to swell and deswell to afford a void region between the particulate material and the stretched extensible polymer layer, and the extensible polymer layer will generally have a thickness that enables it to be stretched and yet maintain within its stretched confines the expanded volume of the swellable polymer layer when in its swollen state.

As an example only, the swellable polymer layer, when in its non-swollen state, may have average thickness of at least 2 nm, or at least 5 nm, or at least 10 nm, or at least 20 nm, or at least 40 nm, or at least 50 nm.

As an example only, the extensible polymer layer, when in its non-stretched state, may have average thickness of at least 50 nm, or at least 60 nm, or at least 70 nm, or at least 80 nm, or at least 100 nm.

Those skilled in the art will appreciate that the thickness of the swellable and extensible polymer layers will in practice be a function of the amount of monomer added during the method of the invention. The swellable polymer is the layer that Can ultimately form a void within the polymer encapsulated material. In order to maximise the impact of the void on the scattering of light by the core particle it is desirable to minimise the amount of water swellable polymer used to achieve a void of given volume.

The swellable polymer can represent no more than about 15%, for example no more than about 10%, of the combined mass of the swellable and extensible polymer layers.

The extensible polymer layer can represent at least 85%, for example at least 90%, of the combined mass of the swellable and extensible polymer layers.

The thickness/mass of the respective layers can be controlled by simply adjusting the amount of the respective monomer compositions polymerised according to the method of the invention.

In one embodiment, the polymer encapsulated particulate material in accordance with the invention will not comprise polymer layers other than the water swellable polymer layer and the extensible polymer layer.

As used herein, the term "alkyl", used either alone or in compound words denotes straight chain, branched or cyclic alkyl, preferably $C_{1-20}$ alkyl, e.g. $C_{1-10}$ or $C_{1-6}$. Examples of straight chain and branched alkyl include methyl, ethyl, n-propyl, isopropyl, n-butyl, sec-butyl, t-butyl, n-pentyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", butyl" etc, it will be understood that this can refer to any of straight, branched and cyclic isomers where appropriate. An alkyl group may be optionally substituted by one or more optional substituents as herein defined.

The term "alkenyl" as used herein denotes groups formed from straight chain, branched or cyclic hydrocarbon residues containing at least one carbon to carbon double bond including ethylenically mono-, di- or polyunsaturated alkyl or cycloalkyl groups as previously defined, preferably $C_{2-20}$ alkenyl (e.g. $C_{2-10}$ or $C_{2-6}$). Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term "alkynyl" denotes groups formed from straight chain, branched or cyclic hydrocarbon residues containing at least one carbon-carbon triple bond including ethylenically mono-, di- or polyunsaturated alkyl or cycloalkyl groups as previously defined. Unless the number of carbon atoms is specified the term preferably refers to $C_{2-20}$ alkynyl (e.g. $C_{2-10}$ or $C_{2-6}$). Examples include ethynyl, 1-propynyl, 2-propynyl, and butynyl isomers, and pentynyl isomers. An alkynyl group may be optionally substituted by one or more optional substituents as herein defined.

The term "halogen" ("halo") denotes fluorine, chlorine, bromine or iodine (fluoro, chloro, bromo or iodo).

The term "aryl" (or "carboaryl") denotes any of single, polynuclear, conjugated and fused residues of aromatic hydrocarbon ring systems (e.g $C_{6-18}$ aryl). Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may or may not be optionally substituted by one or more optional substituents as herein defined. The term "arylene" is intended to denote the divalent form of aryl.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term "carbocyclylene" is intended to denote the divalent form of carbocyclyl.

The term "heteroatom" or "hetero" as used herein in its broadest sense refers to any atom other than a carbon atom which may be, a member of a cyclic organic group. Particular examples of heteroatoms include nitrogen, oxygen, sulfur, phosphorous, boron, silicon, selenium and tellurium, more particularly nitrogen, oxygen and sulfur.

The term "heterocyclyl" when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se, particularly O, N and S. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include azridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydropyranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiazinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl. A heterocyclyl group may be optionally substituted by one or more optional substituents as herein defined. The term "heterocyclylene" is intended to denote the divalent form of heterocyclyl.

The term "heteroaryl" includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems. Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinozalinyl, quinazolinyl, quinolinyl, oxazolyl, thiazolyl, isothiazolyl, isoxazolyl, triazolyl, oxadialzolyl, oxatriazolyl, triazinyl, and furazanyl. A heteroaryl group may be optionally substituted by one or more optional substituents as herein defined. The term "heteroarylene" is intended to denote the divalent form of heteroaryl.

The term "acyl" either alone or in compound words denotes a group containing the moiety C=O (and not being a carboxylic acid, ester or amide) Preferred acyl includes $C(O)-R^e$, wherein $R^e$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The $R^e$ residue may be optionally substituted as described herein.

The term "sulfoxide", either alone or in a compound word, refers to a group —S(O)$R^f$ wherein $R^f$ is selected from hydrogen, alkyl, alkenyl, alkynyl, aryl, heteroaryl, heterocyclyl, carbocyclyl, and aralkyl. Examples of preferred $R^f$ include $C_1$-20alkyl, phenyl and benzyl.

The term "sulfonyl", either alone or in a compound word, refers to a group $S(O)_2$—$R^f$, wherein $R^f$ is selected from hydrogen, alkyl, alkenyl, alkynyl, aryl, heteroaryl, heterocyclyl, carbocyclyl and aralkyl. Examples of preferred $R^f$ include $C_{1-20}$alkyl, phenyl and benzyl.

The term "sulfonamide", either alone or in a compound word, refers to a group S(O)NR$^f$R$^f$ wherein each $R^f$ is independently selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl. In one embodiment at least one $R^f$ is hydrogen. In another embodiment, both $R^f$ are hydrogen.

The term, "amino" is used here in its broadest sense as understood in the art and includes groups of the formula NR$^a$R$^b$ wherein R$^a$ and R$^b$ may be any independently selected from hydrogen, alkyl, alkenyl, alkynyl, aryl, carbocyclyl, heteroaryl, heterocyclyl, arylalkyl, and acyl. R$^a$ and R$^b$, together with the nitrogen to which they are attached, may also form a monocyclic, or polycyclic ring system e.g. a 3-10 membered ring, particularly, 5-6 and 9-10 membered systems. Examples of "amino" include NH$_2$, NHalkyl (e.g. $C_{1-20}$alkyl), NHaryl (e.g. NHphenyl), NHaralkyl (e.g. NHbenzyl), NHacyl (e.g. NHC(O)$C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term "amido" is used here in its broadest sense as understood in the art and includes groups having the formula C(O)NR$^a$R$^b$, wherein R$^a$ and R$^b$ are as defined as above. Examples of amido include C(O)NH$_2$, C(O)NHalkyl (e.g. $C_{1-20}$alkyl), C(O)NHaryl (e.g. C(O)NHphenyl), C(O)NHaralkyl (e.g. C(O)NHbenzyl), C(O)NHacyl (e.g. C(O)NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term "carboxy ester" is used here in its broadest sense as understood in the art and includes groups having the formula CO$_2$R$^g$, wherein R$^g$ may be selected from groups including alkyl, alkenyl, alkynyl, aryl, carbocyclyl, heteroaryl, heterocyclyl, aralkyl, and acyl. Examples of carboxy ester include CO$_2$C$_{1-20}$alkyl, CO$_2$aryl (e.g. CO$_2$phenyl), CO$_2$aralkyl (e.g. CO$_2$ benzyl).

As used herein, the term "aryloxy" refers to an "aryl" group attached through an oxygen bridge. Examples of aryloxy substituents include phenoxy, biphenyloxy, naphthyloxy and the like.

As used herein, the term "acyloxy" refers to an "acyl" group wherein the "acyl" group is in turn attached through an oxygen atom. Examples of "acyloxy" include hexylcarbonyloxy(heptanoyloxy), cyclopentylcarbonyloxy, benzoyloxy, 4-chlorobenzoyloxy, decylcarbonyloxy(undecanoyloxy), propylcarbonyloxy(butanoyloxy), octylcarbonyloxy (nonanoyloxy), biphenylcarbonyloxy (eg 4-phenylbenzoyloxy), naphthylcarbonyloxy (eg 1-naphthoyloxy) and the like.

As used herein, the term "alkyloxycarbonyl" refers to a "alkyloxy" group attached through a carbonyl group. Examples of "alkyloxycarbonyl" groups include butylformate, sec-butylformate, hexylformate, octylformate, decylformate, cyclopentylformate and the like.

As used herein, the term "arylalkyl" refers to groups formed from straight or branched chain alkanes substituted with an aromatic ring. Examples of arylalkyl include phenylmethyl(benzyl), phenylethyl and phenylpropyl.

As used herein, the term "alkylaryl" refers to groups formed from aryl groups substituted with a straight chain or branched alkane. Examples of alkylaryl include methylphenyl and isopropylphenyl.

In this specification "optionally substituted" is taken to mean that a group may or may not be substituted or fused (so as to form a condensed polycyclic group) with one, two, three or more of organic and inorganic groups, including those selected from: alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroayl, nitrocarbocyclyl, nitroacyl, nitroaralkyl, amino (NH$_2$), alkylamino, dialkylamino, alkenylamino, alkynylamino, arylamino, diarylamino, aralkylamino, diaralkylamino, acylamino, diacylamino, heterocyclamino, heteroarylamino, carboxy, carboxyester, amido, allkylsulphonyloxy, arylsulphenyloxy, alkylsulphenyl, arylsulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate, phosphate, triarylmethyl, triarylamino, oxadiazole, and carbazole groups. Optional substitution may also be taken to refer to where a —$CH_2$— group in a chain or ring is replaced by a group selected from —O—, —S—, —$NR^a$—, —C(O)— (i.e. carbonyl), —C(O)O— (i.e. ester), and —C(O)$NR^a$— (i.e. amide), where $R^a$ is as defined herein.

Preferred Optional substituents include alkyl, (e.g. $C_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by $C_{1-6}$ alkyl, halo, hydroxy, hydroxy$C_{1-6}$ alkyl, $C_{1-6}$ alkoxy, cyano, nitro OC(O)$C_{1-6}$alkyl, and amino), benzyl (wherein benzyl itself may be further substituted e.g., by $C_{1-6}$ alkyl, halo, hydroxy, hydroxy$C_{1-6}$alkyl, $C_{1-6}$ alkoxy, halo$C_{1-6}$ alkyl, cyano, nitro OC(O)$C_{1-6}$ alkyl, and amino), phenoxy (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), benzyloxy (wherein benzyl itself may be further substituted e.g., by $C_{1-6}$alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), amino, alkylamino (e.g. $C_{1-6}$ alkyl, such as methylamino, ethylamino, propylamino etc), dialkylamino (e.g. $C_{1-6}$ alkyl, such as dimethylamino, diethylamino, dipropylamino), acylamino (e.g. NHC(O)$CH_3$), phenylamino (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), nitro, formyl, —C(O)-alkyl (e.g. $C_{1-6}$ alkyl, such as acetyl), O—C(O)-alkyl (e.g. $C_{1-6}$alkyl, such as acetyloxy), benzoyl (wherein the phenyl group itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro OC(O)$C_{1-6}$alkyl, and amino), replacement of $CH_2$ with C═O, $CO_2H$, $CO_2$alkyl (e.g. $C_{1-6}$ alkyl such as methyl ester, ethyl ester, propyl ester, butyl ester), $CO_2$-phenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), $CONH_2$, CONHphenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), CONHbenzyl (wherein benzyl itself may be further substituted e.g., by $C_{1-6}$ alkyl, halo, hydroxy hydroxyl $C_{1-6}$ alkyl, $C_{1-6}$ alkoxy, halo $C_{1-6}$ alkyl, cyano, nitro OC(O) $C_{1-6}$ alkyl, and amino), CONHalkyl (e.g. $C_{1-6}$ alkyl such as methyl ester, ethyl ester, propyl ester, butyl amide) CONHdialkyl (e.g. $C_{1-6}$ alkyl) aminoalkyl (e.g., HN $C_{1-6}$ alkyl-, $C_{1-6}$alkylHN—$C_{1-6}$ alkyl- and ($C_{1-6}$ alkyl)$_2$N—$C_{1-6}$ alkyl-), thioalkyl (e.g., HS $C_{1-6}$ alkyl-), carboxyalkyl (e.g., $HO_2CC_{1-6}$ alkyl-), carboxyesteralkyl (e.g., $C_{1-6}$ alkyl$O_2CC_{1-6}$ alkyl-), amidoalkyl (e.g., $H_2N(O)CC_{1-6}$ alkyl-, H($C_{1-6}$ alkyl)N(O)$CC_{1-6}$ alkyl-), formylalkyl (e.g., $OHCC_{1-6}$alkyl-), acylalkyl (e.g., $C_{1-6}$ alkyl(O)$CC_{1-6}$ alkyl-), nitroalkyl (e.g., $O_2NC_{1-6}$ alkyl-), sulfoxidealkyl (e.g., R(O)$SC_{1-6}$ alkyl, such as $C_{1-6}$ alkyl(O)$SC_{1-6}$ alkyl-), sulfonylalkyl (e.g., R(O)$_2SC_{1-6}$ alkyl- such as $C_{1-6}$ alkyl(O)$_2SC_{1-6}$ alkyl-), sulfonamidoalkyl (e.g., $_2$HRN(O)$SC_{1-6}$ alkyl, H($C_{1-6}$ alkyl)N(O)$SC_{1-6}$ alkyl-), triarylmethyl, triarylamino, oxadiazole, and carbazole.

As used herein, the term "salt" denotes a species in ionised form, and includes both acid addition and base addition salts.

As used herein, the term "counter anion" denotes a species capable of providing a negative charge to balance the charge of the corresponding cation. Examples of counter anions include, $Cl^-$, $I^-$, $Br^-$, $F^-$, $NO_3^-$, $CN^-$ and $PO_3^-$.

The invention will now be described with reference to the following examples which illustrate some preferred embodiments of the invention. However, it is to be understood that the particularity of the following description is not to supersede the generality of the preceding description of the invention.

EXAMPLES

Example 1

Example 1a

Preparation of a poly-[(2-sulfoethyl methacrylate)-co-(acrylic acid)-co-(butyl acrylate)] copolymer using 1-dodecanethiol 1-dodecanethiol (0.88 g, 4.4 mmol), 4,4'-azobis(4-cyanovaleric acid) (V501) (0.13 g, 0.5 mmol), acrylic acid (2.99 g, 41.5 mmol), 2-sulfoethyl methacrylate (4.53 g, 22.0 mmol), butyl acrylate (2.18 g, 17.0 mmol) in dioxane (22.98 g) was prepared in a 50 mL round bottom flask. This was stirred magnetically and sparged with nitrogen for 10 minutes. The flask was then maintained at 70° C. for 5 hours under constant stirring. The final copolymer solution was 39.6% solids.

Example 1b

Preparation of Water Swellable Polymer Encapsulated Particulate Material Using the Copolymer from 1a Dispensing the Particulate Material:

In a 100 ml beaker, copolymer solution from Example 1a (1.0 g) was dispersed in water (50.2 g) to yield a solution of pH 2.2. Ammonium hydroxide (2.8% solution in water) was added to the polymer solution to raise the pH to 5.3. Titanium dioxide (Tioxide TR92, Huntsman) (10.04 g) was added to the solution and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.05 g, 0.17 mmol) which was subsequently sealed and purged with nitrogen for 10 minutes. The whole flask was then immersed in an oil bath with a temperature setting of 70° C. and was magnetically stirred. A deoxygenated 1:1:1 (weight ratio) solution (2 mL, 1.90 g) of methyl methacrylate (MMA), butyl acrylate (BA) and methacrylic acid (MA) was injected into the flask at a rate of 2.5 mL/hour Formation of the Extensible Polymer Layer:

After 120 minutes of heating, a deoxygenated monomer solution (5 mL, 4.7 g) of MMA (4.3 g, 42.6 mmol) and BA (0.43 g, 3.3 mmol) was added to the flask at a rate of 2.5 mL/hour while temperature was still maintained at 70° C. Upon completion of this monomer addition, temperature of the oil bath was maintained at 70° C. for another 1 hour. A deoxygenated styrene solution (7.5 mL, 7.04 g, 67.6 mmol) was then injected into the flask at 2.5 mL/hour while the heating was continued for another 18 hours to produce a white and stable latex.

Swelling the Swellable Polymer Layer:

To this latex (2 g), water (20 g) was added and the pH was adjusted to 11 with ammonium hydroxide (28%). The latex was transferred to a round bottom flask which was subsequently sealed and magnetically stirred in a 95° C. oil bath for 2 hours.

The resulting latex was allowed to dry which promoted dehydration of the swollen swellable polymer layer. The polymer encapsulated particulate material was then analysed by TEM. The resulting TEM image clearly showed a void region that had been formed in between the particulate material and the extensible polymer layer.

Example 2

Example 2a

Preparation of a poly-[(acrylic acid)-co-(butyl acrylate)] copolymer using 1-dodecanethiol 1-dodecanethiol (0.39 g, 1.9 mmol), 4,4'-azobis(4-cyanovaleric acid) (V501) (0.06 g, 0.2 mmol), acrylic acid (4.96 g, 68.8 mmol), butyl acrylate (2.21 g, 17.2 mmol) in dioxane (10.0 g) was prepared in a 50 mL round bottom flask. This was stirred magnetically and sparged with nitrogen for 10 minutes. The flask was then maintained at 70° C. for 2.5 hours under constant stirring. The final copolymer solution had 48.4%.

Example 2b

Preparation of Water Swellable Polymer Encapsulated Particulate Material Using the Copolymer from 2a Dispensing the Particulate Material:

In a 100 ml beaker, copolymer solution from Example 2a (1.27 g) was dispersed in water (50.0 g). Ammonium hydroxide (2.8% solution in water) was added to the polymer solution to raise the pH to 4.8. Titanium dioxide (Tioxide TR92, Huntsman) (9.96 g) was added to the solution and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to, a 100 mL round bottom flask containing 4,4'-azobis(4-cyanovaleric acid) (V501) (0.04 g, 0.15 mmol) which was subsequently sealed and purged with nitrogen for 10 minutes. The whole flask was then immersed in an oil bath with a temperature setting of 70° C. and was magnetically stirred. A deoxygenated 1:1:1 (weight ratio) solution (2 mL, 1.90 g) of methyl methacrylate (MMA), butyl acrylate (BA) and methacrylic acid (MA) was injected into the flask at a rate of 2.5 mL/hour.

Formation of the Extensible Polymer Layer:

After 120 minutes of heating, a deoxygenated monomer solution (5 mL, 4.7 g) of MMA (4.3 g, 42.6 mmol) and BA (0.43 g, 3.3 mmol) was added to the flask at a rate of 2.5 mL/hour while the temperature was still maintained at 70° C. Upon completion of this monomer addition, the temperature of the oil bath was maintained at 70° C. for another 1 hour. A deoxygenated styrene solution (7.5 mL, 7.04 g, 67.6 mmol) was then injected into the flask at 2.5 mL/hour while the heating was continued for another 19 hours to produce a white and stable latex.

Swelling the Swellable Polymer Layer:

To this latex (2 g), water (20 g) was added and the pH was adjusted to 11 with ammonium hydroxide (28%). The latex was transferred to a round bottom flask which was subsequently sealed and magnetically stirred in a 95° C. oil bath for 2 hours.

The resulting latex was allowed to dry which promoted dehydration of the swollen swellable polymer layer. The polymer encapsulated particulate material was then analysed by TEM. The resulting TEM image clearly showed a void region that had been formed in between the particulate material and the extensible polymer layer.

Example 3

Preparation of Water Swellable Polymer Encapsulated Particulate Material Using the Orotan 731A (DOW)

Dispensing the Particulate Material:

In a 100 ml beaker, Orotan 731A copolymer solution (0.82 g) was dispersed in water (50.0 g). 1M Hydrochloric acid solution was added to the polymer solution to lower the pH to 5.1. Titanium dioxide (Tioxide TR92, Huntsman) (10.02 g) was added to the solution and thoroughly dispersed using a Vibra-Cell Ultrasonic Processor (Sonics and Materials, Inc.) standard probe at an amplitude of 30% for 15 minutes.

Forming the Water Swellable Layer:

After sonication, the dispersion was transferred to a 100 mL round bottom flask containing sodium dodecyl sulphate (0.05 g, 0.2 mmol) and 4,4'-azobis(4-cyanovaleric acid) (V501) (0.04 g, 0.15 mmol) which was subsequently sealed and purged with nitrogen for 10 minutes. The whole flask was then immersed in an oil bath with a temperature setting of 70° C. and magnetically stirred. A deoxygenated 1:1:1 (weight ratio) solution (1.25 mL, 1.19 g) of methyl methacrylate (MMA), butyl acrylate (BA) and methacrylic acid (MA) was injected into the flask at a rate of 2.5 mL/hour.

Formation of the Extensible Polymer Layer:

After 60 minutes of heating, a deoxygenated monomer solution (5 mL, 4.7 g) of MMA (4.3 g, 42.6 mmol) and BA (0.43 g, 3.3 mmol) was added to the flask at a rate of 2.5 mL/hour while temperature was still maintained at 70° C. Upon completion of this monomer addition, temperature of the oil bath was maintained at 70° C. for another 3 hour. A deoxygenated styrene solution (7.5 mL, 7.04 g, 67.6 mmol) was then injected to the flask at 2.5 mL/hour while the heating was continued for another 16 hours to produce a white latex.

Swelling the Swellable Polymer Layer:

To this latex (2 g), water (20 g) was added and the pH was adjusted to 11 with ammonium hydroxide (28%). The latex was transferred to a round bottom flask which was subsequently sealed and magnetically stirred in a 95° C. oil bath for 2 hours.

The resulting latex was allowed to dry which promoted dehydration of the swollen swellable polymer layer. The polymer encapsulated particulate material was then analysed by TEM. The resulting TEM image clearly showed a void region that had been formed in between the particulate material and the extensible polymer layer.

Example 4

Preparation of Water Swellable Polymer Encapsulated Particulate Material Using Orotan 731A (DOW)

Dispensing the Particulate Material:

In a 1 L beaker, Orotan 731A copolymer solution (8.0 g) was dispersed in water (500.8 g). Hydrochloric acid solution (16%) was added to the polymer solution to lower the pH to 7.5. Titanium dioxide (Tioxide TR92, Huntsman) (100.9 g) was added to the solution and thoroughly dispersed using a Vibra-Cell Ultrasonic Processor (Sonics and Materials, Inc.) standard probe at an amplitude of 30% for 30 minutes. After sonication, sodium dodecyl sulphate (SDS) (0.7 g) was added to the dispersion, followed by another slow addition of hydrochloric acid solution (16%) to adjust the pH to 4.7 while under constant stirring.

Forming the Water Swellable Layer:

The dispersion was, transferred to a 1 L round bottom flask containing 4,4'-azobis(4-cyanovaleric acid) (V501) (0.1 g, 0.4 mmol) which was subsequently sealed and purged with nitrogen for 15 minutes. The whole flask was then immersed in an oil bath with a temperature setting of 70° C. and magnetically stirred. After 15 minutes, a deoxygenated 2:2:1 (weight ratio) solution (15 mL, 14.1 g) of methyl methacrylate (MMA), butyl acrylate (BA) and methacrylic acid (MA) was injected into the flask, while in the 70° C. oil bath, at a rate of 5 mL/hour. A 5% SDS solution (6 mL) was also injected into the flask at a rate of 2 mL/hour. Upon completion of the monomer addition, the temperature of the oil bath was maintained at 70° C. for another 14 hours. The resulted product was filtered with through wool to yield a white stable latex.

Formation of the Extensible Polymer Layer:

The above latex was transferred to a 1 L round bottom flask containing 4,4'-azobis(4-cyanovaleric acid) (V501) (0.1 g, 0.4 mmol) which was subsequently sealed and purged with nitrogen for 15 minutes. The whole flask was then immersed in an oil bath with a temperature setting of 70° C. and was magnetically stirred. After 15 minutes of heating, a deoxygenated monomer solution (50 mL, 46.9 g) of MMA (42.7 g, 426 mmol) and BA (4.3 g, 33 mmol) was added to the flask at a rate of 10 mL/hour while temperature was still maintained at 70° C. A 5% SDS solution (20 mL) was also injected into the flask at a rate of 4 mL/hour. Upon completion of this monomer addition, the temperature of the oil bath was maintained at 70° C. for another 18 hours. The resulted product was filtered through glass wool to yield a white stable latex.

After filtering, the latex was transferred to a 1 L round bottom flask containing 4,4'-azobis(4-cyanovaleric acid) (V501) (0.2 g, 0.8 mmol) which was subsequently sealed and purged with nitrogen for 15 minutes. The whole flask was then immersed in an oil bath with a temperature setting of 70° C. and was magnetically stirred. After 15 minutes, a deoxygenated styrene solution (75 mL, 70.4 g, 676 mmol) was then injected into the flask at a rate of 15 mL/hour while the temperature was still maintained at 70° C. A 5% SDS solution (30 mL) was also injected into the flask at a rate of 6 mL/hour. Upon completion of this monomer addition, the temperature of the oil bath was maintained at 70° C. for another 18 hours. The resulted product was filtered through glass wool to yield a white stable latex.

Swelling the Swellable Polymer Layer:

To this latex (49.4 g), water (25.8 g) and SDS (0.1 g) was added and the pH was adjusted to 11 with ammonium hydroxide (28%). The latex was transferred to a round bottom flask which was subsequently sealed and magnetically stirred in a 95° C. oil bath for 5 hours.

Crosslinking of Polymer Shells

After swelling with base, 4,4'-azobis(4-cyanovaleric acid) (V501) (0.04 g, 0.2 mmol) and divinyl benzene (DVB) (1.0 g, 7.7 mmol) were added to the polymer latex in a round bottom flask. The flask was then sealed, purged with nitrogen for 10 minutes and magnetically stirred in an oil bath at 70° C. for another 2 hours. After filtering, the polymer encapsulated particulate material in the resulting latex was allowed to dry and then analysed by TEM. The resulting TEM image clearly showed a void region that had been formed in between the particulate material and the extensible polymer layer. A thermogravimetric measurement (Hi-Res TGA 2950 Thermogravimetric Analyzer, TA instruments) showed that the voided particles contained 45% polymer content. Particle sizing performed on a Zetasizer (Malvern Instruments) showed the final latex contained particles with an average diameter of 767 nm.

Example 5

Preparation of Water Swellable Polymer Encapsulated Particulate Material Using Orotan 731A (DOW) and Tipure R706 Titanium Dioxide Pigment (DuPont)

Dispersing the Particulate Material:

In a 1 L beaker, Orotan 731A copolymer solution (8.0 g) was dispersed in water (500.7 g). Hydrochloric acid solution (16%) was added to the polymer solution to lower the pH to 7.5. Titanium dioxide (Tipure R706, DuPont) (100.3 g) was added to the solution and was thoroughly dispersed using a Vibra-Cell Ultrasonic Processor (Sonics and Materials, Inc.) standard probe at an amplitude of 30% for 30 minutes. After sonication, sodium dodecyl sulphate (SDS) (0.7 g) was added to the dispersion, following by another slow addition of hydrochloric acid solution (16%) while under constant stirring to adjust the pH to 4.6.

Forming the Water Swellable Layer:

The dispersion was transferred to a 1 L round bottom flask containing 4,4'-azobis(4-cyanovaleric acid) (V501) (0.1 g, 0.4 mmol) which was subsequently sealed and purged with nitrogen for 15 minutes. The whole flask was then immersed in an oil bath with a temperature setting of 70° C. and was magnetically stirred. After 15 minutes, a deoxygenated 2:2:1 (weight ratio) solution (15 mL, 14.1 g) of methyl methacrylate (MMA), butyl acrylate (BA) and methacrylic acid (MA) was injected into the flask, while in the 70° C. oil bath, at a rate of 5 mL/hour. A 5% SDS solution (6 mL) was also injected into the flask at a rate of 2 mL/hour. Upon completion of the monomer addition, the temperature of the oil bath was maintained at 70° C. for another 19 hours. The resulted product was filtered through glass wool to yield a white stable latex.

Formation of the Extensible Polymer Layer:

The above latex was transferred to a 1 L round bottom flask containing 4,4'-azobis(4-cyanovaleric acid) (V501) (0.1 g, 0.4 mmol) which was subsequently sealed and purged with nitrogen for 15 minutes. The whole flask was then immersed in an oil bath with a temperature setting of 70° C. and was magnetically stirred. After 15 minutes of heating, a deoxygenated monomer solution (50 mL, 46.9 g) of MMA (42.7 g, 426 mmol) and BA (4.3 g, 33 mmol) was added to the flask at a rate of 10 mL/hour while temperature was still maintained at 70° C. A 5% SDS solution (20 mL) was also injected into the flask at a rate of 4 mL/hour. Upon completion of this monomer addition, the temperature of the oil bath was maintained at 70° C. for another 16 hours. The resulted product was filtered through glass wool to yield a white stable latex.

After filtering, the latex was transferred to a 1 L round bottom flask containing 4,4'-azobis(4-cyanovaleric acid) (V501) (0.2 g, 0.7 mmol) which was subsequently sealed and purged with nitrogen for 15 minutes. The whole flask was then immersed in an oil bath with a temperature setting of 70° C. and was magnetically stirred. After 15 minutes of heating, a deoxygenated styrene solution (75 mL, 70.4 g, 676 mmol) was then injected to the flask at a rate of 15 mL/hour while the temperature was still maintained at 70° C. A 5% SDS solution (30 mL) was also injected into the flask at a rate of 6 mL/hour. Upon completion of this monomer addition, the temperature of the oil bath was maintained at 70° C. for another 18 hours. The resulted product was filtered through glass wool to yield a white stable latex with 28.3% solids.

Swelling the Swellable Polymer Layer:

To this latex (54 g), water (25.5 g) and SDS (0.1 g) was added and the pH was adjusted to 11 with ammonium hydroxide (28%). The latex was transferred to a round bottom flask which was subsequently sealed and magnetically stirred in a 95° C. oil bath for 5 hours.

Crosslinking of Polymer Shells

After swelling with base, 4,4'-azobis(4-cyanovaleric acid) (V501) (0.03 g, 0.1 mmol), SDS (0.1 g) and divinyl benzene (DVB) (1.1 g, 8.7 mmol) was added to the polymer latex in a round bottom flask. The flask was then sealed, purged with nitrogen for 10 minutes and magnetically stirred in an oil bath at 70° C. for a further 2 hours. After filtering, the polymer encapsulated particulate material in the resulting latex was allowed to dry and then analysed by TEM. The resulting TEM image clearly showed a void region that had been formed in between the particulate material and the extensible polymer layer. A thermogravimetric measurement (Hi-Res TGA 2950 Thermogravimetric Analyzer, TA instruments) showed that the voided particles contained 45.6% polymer content. Particle sizing performed on Zetasizer (Malvern Instruments) showed the final latex contained particles with an average diameter of 711 nm. The final latex was 20.4% solids.

Example 6

Synthesis of Nanorattles Containing Yellow Bismuth Vanadate Pigment (Irgazin Yellow 2094, Ciba Specialty Chemicals) Using Copolymers from 1a Dispensing the Particulate Material:

In a 100 ml beaker, polymer solution from Example 1a (0.50 g) was dispersed in water (50.66 g) to yield a solution of pH 1.8. Ammonium hydroxide (2.8%) and hydrochloric acid (1%) solutions were used to adjust the pH to 4. To this solution, bismuth vanadate yellow pigment (Irgazin yellow 2094, Ciba Specialty Chemicals) (5.03 g) was added and was thoroughly dispersed using a Vibra-Cell Ultrasonic Processor (Sonics and Materials, Inc.) standard probe at an amplitude of 30% for 10 minutes.

Forming the Water Swellable Layer:

The dispersion was then transferred to a 100 mL round bottom flask containing 4,4'-azobis(4-cyanovaleric acid) (V501) (0.027 g, 0.1 mmol) which was subsequently sealed and purged with nitrogen for 10 minutes. The whole flask was then immersed in an oil bath with a temperature setting of 70° C. and was magnetically stirred. A deoxygenated 1:1:1 (weight ratio) solution (1 mL, 0.95 g) of methyl methacrylate (MMA), butyl acrylate (BA) and methacrylic acid (MA) was injected into the flask at a rate of 2 mL/hour.

Formation of the Extensible Polymer Layer:

After 60 minutes of heating, a deoxygenated monomer solution (2 mL, 1.9 g) of MMA (1.7 g, 17.0 mmol) and BA (0.17 g, 1.3 mmol) was added to the flask at a rate of 2 mL/hour while the temperature was still maintained at 70° C. Upon completion of this monomer addition, the temperature of the oil bath was maintained at 70° C. for another 1 hour. A deoxygenated styrene solution (2 mL, 1.81 g, 18.4 mmol) was then injected to the flask at 2 mL/hour while the heating was continued for another 18 hours to produce a yellow latex.

Swelling the Swellable Polymer Layer:

After filtering, 2 g of the latex was added to 20 g of water and the pH of the diluted latex was adjusted to 11 with ammonium hydroxide (28%). The latex was transferred to a round bottom flask which was subsequently sealed and magnetically stirred in a 95° C. oil bath for 12 hours.

The resulting latex was allowed to dry which promoted dehydration of the swollen swellable polymer layer. The polymer encapsulated particulate material was then analysed by TEM. The resulting TEM image clearly showed a void region that had been formed in between the particulate material and the extensible polymer layer.

Example 7

Preparation of Water Swellable Polymer Encapsulated Particulate Material Using the Orotan 731a (DOW) with MMA/Styrene in the Second Monomer Feed Dispensing the Particulate Material:

In a 100 ml beaker, Orotan 731A copolymer solution (1.01 g) was dispersed in water (50.1 g). Hydrochloric acid solution (1%) was added to the polymer solution to lower the pH to 6.2. Titanium dioxide (Tioxide TR92, Huntsman) (10.6 g) was added to the solution and was thoroughly dispersed using a Vibra-Cell Ultrasonic Processor (Sonics and Materials, Inc.) standard probe at an amplitude of 30% for 10 minutes.

Forming the Water Swellable Layer:

After sonication, the dispersion was transferred to a 100 mL round bottom flask containing 4,4'-azobis(4-cyanovaleric acid) (V501) (0.04 g, 0.14 mmol) which was subsequently sealed and purged with nitrogen for 10 minutes. The whole flask was then immersed in an oil bath with a temperature setting of 70° C. and was magnetically stirred. A 2% SDS solution (2.5 mL) was injected into the flask at a rate of 2.5 mL/hour. After 5 minutes of heating, a deoxygenated 1:1:1 (weight ratio) solution (2 mL, 1.9 g) of methyl methacrylate (MMA), butyl acrylate (BA) and methacrylic acid (MA) was injected into the flask at a rate of 2.5 mL/hour.

Formation of the Extensible Polymer Layer:

After 60 minutes of heating, a deoxygenated monomer solution (10 mL, 9.4 g) of MMA (6.57 g, 65.6 mmol) and styrene (2.81 g, 27.0 mmol) was added to the flask at a rate of 2.5 mL/hour while the temperature was still maintained at 70° C. Upon completion of this monomer addition, the temperature of the oil bath was maintained at 70° C. for another 13 hours to produce a white latex.

Swelling the Swellable Polymer Layer:

To this latex (2 g), water (20 g) was added and the pH was adjusted to 11 with ammonium hydroxide (28%). The latex was transferred to a round bottom flask which was subsequently sealed and magnetically stirred in a 95° C. oil bath for 2 hours.

The resulting latex was allowed to dry which promoted dehydration of the swollen swellable polymer layer. The polymer encapsulated particulate material was then analysed by TEM. The resulting TEM image clearly showed a void region that had been formed in between the particulate material and the extensible polymer layer.

Example 8

Preparation of Water Swellable Polymer Encapsulated Particulate Material Using the Orotan 731A (DOW) and 2-sulfoethyl Methacrylate in the First Acid Monomer Feed Dispensing the Particulate Material:

In a 100 ml beaker, Orotan 731A copolymer solution (0.6 g) was dispersed in water (50.1 g). Hydrochloric acid solution (1%) was added to the polymer solution to lower the pH to 7.5. Titanium dioxide (Tioxide TR92, Huntsman) (10.1 g) was added to the solution and thoroughly dispersed using a Vibra-Cell Ultrasonic Processor (Sonics and Materials, Inc.) standard probe at an amplitude of 30% for 10 minutes.

Forming the Water Swellable Layer:

After sonication, sodium dodecyl sulphate (0.07 g) was added to the dispersion which was then transferred to a 100 mL round bottom flask containing 4,4'-azobis(4-cyanovaleric acid) (V501) (0.04 g, 0.15 mmol). The flask was subsequently sealed and purged with nitrogen for 10 minutes. The whole flask was then immersed in an oil bath with a temperature setting of 70° C. and was magnetically stirred. After 5 minutes of heating, a 2% SDS solution (1 mL) was injected into the flask at a rate of 2 mL/hour. At the same time, a deoxygenated 20:20:10:1 (weight ratio) solution (0.75 mL, 0.71 g) of methyl methacrylate (MMA), butyl acrylate (BA), methacrylic acid (MA) and 2-sulfoethyl methacrylate was injected into the flask at a rate of 2 mL/hour.

Formation of the Extensible Polymer Layer:

After 60 minutes of heating, a deoxygenated monomer solution (2.5 mL, 2.4 g) of MMA (2.13 g, 21.3 mmol) and butyl acrylate (0.21 g, 1.7 mmol) was added to the flask at a rate of 2.5 mL/hour while the temperature was maintained at 70° C. A 2% SDS solution (2 mL) was also injected into the flask at a rate of 2 mL/hour. Upon completion of this monomer addition, the temperature of the oil bath was maintained at 70° C. for another 1 hour. A deoxygenated styrene solution (5 mL, 4.53 g, 43.5 mmol) was then injected to the flask at 2.5 mL/hour while the heating was continued for another 18 hours to yield a white and stable latex.

Swelling the Swellable Polymer Layer:

To this latex (10 g), water (10 g) was added and the pH was adjusted to 11 with ammonium hydroxide (28%). The latex was transferred to a round bottom flask which was subsequently sealed and magnetically stirred in a 95° C. oil bath for 2 hours.

The polymer encapsulated particulate material in the resulting latex was allowed to dry and then analysed by TEM. The resulting TEM image clearly showed a void region that had been formed in between the particulate material and the extensible polymer layer. A thermogravimetric measurement (Hi-Res TGA 2950 Thermogravimetric Analyzer, TA instruments) showed that the voided particles contained 32.9% polymer. Particle sizing performed on Zetasizer (Malvern Instruments) showed the final latex contained particles with an average diameter of 455 nm.

Example 9

Preparation of Water Swellable Polymer Encapsulated Particulate Material Using Orotan 681 (DOW) and 2-Sulfoethyl Methacrylate in the First Acid Monomer Feed Dispensing the Particulate Material:

In a 100 ml beaker, Orotan 681 copolymer solution (0.6 g) was dispersed in water (50.6 g). Titanium dioxide (Tioxide TR92, Huntsman) (10.0 g) was added to the solution and was thoroughly dispersed using a Vibra-Cell Ultrasonic Processor (Sonics and Materials, Inc.) standard probe at an amplitude of 30% for 10 minutes.

Forming the Water Swellable Layer:

After sonication, sodium dodecyl sulphate (SDS) (0.07 g) was added to the dispersion which was then transferred to a 100 mL round bottom flask containing 4,4'-azobis(4-cyanovaleric acid) (V501) (0.04 g, 0.15 mmol). The flask was subsequently sealed and purged with nitrogen for 10 minutes. The whole flask was then immersed in an oil bath with a temperature setting of 70° C. and was magnetically stirred. After 5 minutes, a 2% SDS solution (1 mL) was injected into the flask at a rate of 2 mL/hour. At the same time, a deoxygenated 20:20:10:1 (weight ratio) solution (0.75 mL, 0.71 g) of methyl methacrylate (MMA), butyl acrylate (BA), methacrylic acid (MA) and 2-sulfoethyl methacrylate was injected into the flask at a rate of 2 mL/hour.

Formation of the Extensible Polymer Layer:

After 60 minutes of heating, a deoxygenated monomer solution (2.5 mL, 2.4 g) of MMA (2.13 g, 21.3 mmol) and butyl acrylate (0.21 g, 1.7 mmol) was added to the flask at a rate of 2.5 mL/hour while the temperature was maintained at 70° C. A 2% SDS solution (2 mL) was also injected into the flask at a rate of 2 mL/hour. Upon completion of this monomer addition, the temperature of the oil bath was maintained at 70° C. for another 1 hour. A deoxygenated styrene solution (5 mL, 4.53 g, 43.5 mmol) was then injected to the flask at 2.5 mL/hour while the heating was continued for another 16 hours to yield a white and stable latex.

Swelling the Swellable Polymer Layer:

To this latex (10 g), water (10 g) was added and the pH was adjusted to 11 with ammonium hydroxide (28%). The latex was transferred to a round bottom flask which was subsequently sealed and magnetically stirred in a 95° C. oil bath for 2 hours.

The polymer encapsulated particulate material in the resulting latex was allowed to dry and then analysed by TEM. The resulting TEM image clearly showed a void region that had been formed in between the particulate material and the extensible polymer layer. A thermogravimetric measurement (Hi-Res TGA 2950 Thermogravimetric Analyzer, TA instruments) showed that the voided particles contained 24% polymer. Particle sizing performed on Zetasizer (Malvern Instruments) showed the final latex contained particles with an average diameter of 413 nm.

Example 10

Preparation of Water Swellable Polymer Encapsulated Particulate Material Using the Orotan 731A (DOW) with MMA in the Second Monomer Feed Dispensing the Particulate Material:

In a 100 ml beaker, Orotan 731A copolymer solution (0.6 g) was dispersed in water (50.7 g). Hydrochloric acid solution (1%) was added to the polymer solution to lower, the pH to 7.8. Titanium dioxide (Tioxide TR92, Huntsman) (10.1 g) was added to the solution and was thoroughly dispersed using a Vibra-Cell Ultrasonic Processor (Sonics and Materials, Inc.) standard probe at an amplitude of 30% for 10 minutes.

Forming the Water Swellable Layer:

After sonication, sodium dodecyl sulphate (SDS) (0.07 g) was added to the dispersion which was then transferred to a 100 mL round bottom flask containing 4,4'-azobis(4-cyanovaleric acid) (V501) (0.04 g, 0.15 mmol). The flask was subsequently sealed and purged with nitrogen for 10 minutes. The whole flask was then immersed in an oil bath with a temperature setting of 70° C. and was magnetically stirred. After 5 minutes, a 2% SDS solution (1 mL) was injected into the flask at a rate of 2 mL/hour. At the same time, a deoxygenated 2:2:1 (weight ratio) solution (0.75 mL, 0.7 g) of methyl methacrylate (MMA), butyl acrylate (BA) and methacrylic acid (MA) was injected into the flask at a rate of 2 mL/hour.

Formation of the Extensible Polymer Layer:

After 60 minutes of heating, a deoxygenated monomer solution of MMA (7.5 mL, 7.1 g) was added to the flask at a rate of 2.5 mL/hour while temperature was still maintained at 70° C. A 2% SDS solution (6 mL) was also injected into the flask at a rate of 2 mL/hour. Upon completion of the monomer addition, the temperature of the oil bath was maintained at 70° C. for another 18 hours to yield a white latex.

Swelling the Swellable Polymer Layer:

To this latex (10 g), water (10 g) was added and the pH was adjusted to 11 with ammonium hydroxide (28%). The latex was transferred to a round bottom flask which was subsequently sealed and magnetically stirred in a 95° C. oil bath for 2 hours.

Crosslinking of Polymer Shells

After swelling with base, 4,4'-azobis(4-cyanovaleric acid) (V501) (0.03 g, 0.1 mmol) and divinyl benzene (DVB) (0.31 g) was added to the polymer latex in a round bottom flask. The flask was then sealed, purged with nitrogen for 10 minutes and magnetically stirred in a 70° C. oil bath for another 2 hours.

The polymer encapsulated particulate material in the resulting latex was allowed to dry and then analysed by TEM. The resulting TEM image clearly showed a void region that had been formed in between the particulate material and the extensible polymer layer. Particle sizing performed on Zetasizer (Malvern Instruments) showed the final latex contained particles with an average diameter of 453 nm.

Example 11

Preparation of a Water Swellable Polymer Encapsulated Particulate Material Using Orotan 731A (DOW) with Ammonium Persulfate as an Initiator Dispersing the Particulate Material:

In a 100 mL jar, water (80.0 g), titanium dioxide (Tioxide TR92, Huntsman) (20.1 g) and Orotan 731A (1.3 g) were added and mixed thoroughly. While stirring, 16% hydrochloric acid was slowly added to lower the pH to 7.3. The slurry was then thoroughly dispersed using a Sonifier 450 (Branson Ultrasonics Corporation) standard probe at an amplitude of 40% for 10 minutes. After sonication, sodium dodecyl sulphate (SDS) (0.14 g) was added to the dispersion, followed by another slow addition of 16% hydrochloric acid to adjust the pH to 7.02, while under constant stirring.

Forming the Water Swellable Layer:

The dispersion was transferred to a 250 mL round bottom flask which was subsequently sealed and purged with nitrogen for 15 minutes. The whole flask was then immersed in an oil bath with a temperature setting of 80° C. and was magnetically stirred. Upon reaching the temperature, ammonium persulfate (APS) (0.05 g, 0.22 mmol) was added to the dispersion and a 2:2:1 (weight ratio) solution (3.3 mL, 3.0 g) of methyl methacrylate (MMA), butyl acrylate (BA) and methacrylic acid (MA) was injected into the flask, while in the 80° C. oil bath, at a rate of 4.95 mL/hr. An initiator solution consisting of water (2.14 g), APS (0.056 g, 0.25 mmol) and 25% ammonium hydroxide (0.019 g) was injected at the same time, at a rate of 3.3 mL/hr. As well as this, a 2% SDS solution (3 mL) was injected at a rate of 4.5 mL/hr. Upon completion of the monomer addition, the temperature of the oil bath was maintained at 80° C. for no more than 10 minutes. After this hold, the resulting product was immediately taken through to the next stage.

Forming the Extensible Polymer Layer:

To the above latex, a monomer solution (12.44 g, 13.43 mL) of BA (1.33 g, 10.4 mmol), MMA (7.38 g, 73.7 mmol) and styrene (3.73 g, 35.9 mmol) was injected into the flask at a rate of 6.72 mL/hr. An initiator solution consisting of water (6.40 g), APS (0.1665 g, 0.73 mmol) and 25% ammonium hydroxide (0.057 g) was injected at the same time, at a rate of 3.32 mL/hr. As well as this, a 2% SDS solution (25 mL) was injected at a rate of 12.5 mL/hr. Upon completion of the monomer addition, the temperature of the oil bath was maintained at 80° C. for another 1 hour. The resulting product was filtered through 40 µm silk filter to yield a white stable latex.

Swelling the Swellable Polymer Layer:

To this latex (150.0 g), the pH was adjusted to 10 with 25% ammonium hydroxide. The latex was transferred to a round bottom flask which was subsequently sealed and magnetically stirred under a nitrogen blanket in a 95° C. oil bath for 3 hours.

Cross-Linking of Polymer Shells:

After swelling with base, ammonium persulfate (0.025 g, 0.11 mmol) and divinyl benzene (DVB) (0.53 g, 4.07 mmol) were added to the polymer latex in a round bottom flask. The flask was then sealed and magnetically stirred in an 85° Coil bath under a nitrogen blanket for 2 hours. Particle sizing of the filtered polymer encapsulated particulate material, performed on a Zetasizer (Malvern Instruments), showed that the final latex contained particles with an average diameter of 556 nm.

Example 12

Preparation of a Water Swellable Polymer Encapsulated Particulate Material Using a Random Co-Oligomer Dispersant Preparation of the Random Co-Oligomer:

To a 1 L flange flask, PEG 200 (149.3 g) and propylene glycol (149.3 g) were added and the flask was set up with an overhead stirrer, reflux condenser, thermocouple and addition port. The entire apparatus was immersed in a water bath and heated to 80° C. while stirring under a nitrogen blanket. Upon reaching the temperature, VAZO™67 (0.75 g, 3.90 mmol) was added, as well as 10% by weight of a solution (199.1 g, 207 mL) consisting of acrylic acid (AA) (67.9 g, 942.5 mmol), butyl acrylate (BA) (25.13 g, 196.4 mmol), methyl methacrylate (MMA) (98.18 g, 981.1 mmol) and dodecanethiol (7.93 g, 39.3 mmol). The remainder of the solution (179.2 g, 186.3 mL) was injected into the flask at a rate of 37.3 mL/hr. After 2.5 hours of injecting this monomer solution, another addition of VAZO™67 (0.75 g, 3.90 mmol) was made. Upon completion of the monomer addition, a final addition of VAZO™67 (0.75 g, 3.90 mmol) was made and the temperature, of the water bath was maintained for another 2 hours. The resulting product was a clear viscous liquid.

Dispersing the Particulate Material:

In a 100 mL jar, water (80.0 g), titanium dioxide (Tioxide TR92, Huntsman) (20.1 g), Foamex 825 (0.10 g) and the above oligomer (2.00 g) were added and mixed thoroughly. While stirring, 25% ammonium hydroxide was added to bring the pH up to 7.3. The slurry was then thoroughly dispersed using a Sonifier 450 (Branson Ultrasonics Corporation) standard probe at an amplitude of 40% for 10 minutes. After sonication, sodium dodecyl sulfate (SDS) (0.14 g) was added to the dispersion, followed by another slow addition of 25% ammonium hydroxide to adjust the pH to 7.5, while under constant stirring.

Forming the Water Swellable Layer:

The dispersion was transferred to a 250 mL round bottom flask which was subsequently sealed and purged with nitrogen for 15 minutes. The whole flask was then immersed in an oil bath with a temperature setting of 80° C. and was magnetically stirred. Upon reaching the temperature, ammonium persulfate (APS) (0.05 g, 0.22 mmol) was added to the dispersion and a 2:2:1 (weight ratio) solution (3.3 mL, 3.0 g) of MMA, BA and methacrylic acid (MA) was injected into the flask, while in the 80° C. oil bath, at a rate of 4.95 mL/hr. An initiator solution consisting of water (2.14 g), APS (0.056 g, 0.25 mmol) and 25% ammonium hydroxide (0.019 g) was injected at the same time, at a rate of 3.3 mL/hr. As well as this, a 2% SDS solution (3 mL) was injected at a rate of 4.5 mL/hr. Upon completion of the monomer addition, the temperature of the oil bath was maintained at 80° C. for no more than 10 minutes. After this hold, the resulting product was immediately taken through to the next stage.

Forming the Extensible Polymer Layer:

To the above latex, a monomer solution (12.44 g, 13.43 mL) of BA (1.33 g, 10.4 mmol), MMA (7.38 g, 73.7 mmol) and styrene (3.73 g, 35.9 mmol) was injected into the flask at a rate of 6.72 mL/hr. An initiator solution consisting of water (6.40 g), APS (0.1665 g, 0.73 mmol) and 25% ammonium hydroxide (0.057 g) was injected at the same time, at a rate of 3.32 mL/hr. As well as this, a 2% SDS solution (25 mL) was injected at a rate of 12.5 mL/hr. Upon completion of the monomer addition, the temperature of the oil bath was maintained at 80° C. for another 1 hour. The resulting product was filtered through 40 μm silk filter to give a white stable latex.

Swelling the Swellable Polymer Layer:

To this latex (150.0 g), SDS (0.3 g) was added and the pH was adjusted to 11 with 25% ammonium hydroxide. The latex was transferred to a round bottom flask which was subsequently sealed and magnetically stirred under a nitrogen blanket in a 95° C. oil bath for 3 hours.

Cross-Linking of Polymer Shells:

After swelling with base, ammonium persulfate (0.025 g, 0.11 mmol) and divinyl benzene (DVB) (0.53 g, 4.07 mmol) was added to the polymer latex in a round bottom flask. The flask was then sealed and magnetically stirred under a nitrogen blanket in a 85° C. oil bath for 2 hours. Particle sizing of the filtered polymer encapsulated particulate material, performed on a Zetasizer (Malvern Instruments), showed that the final latex contained particles with an average diameter of 454.5 nm.

The following two examples illustrate the role of free surfactant in controlling the amount of polymer formed that is not associated with the water swellable polymer particles:

Example 13

Preparation of Water Swellable Polymer Encapsulated Particulate Material Using the Orotan 731A (DOW)

Dispensing the Particulate Material:

In a 100 ml beaker, Orotan 731A copolymer solution (0.6 g) was dispersed in water (50.8 g). Hydrochloric acid solution (1%) was added to the polymer solution to lower the pH to 7.6. Titanium dioxide (Tioxide TR92, Huntsman) (10.1 g) was added to the solution and thoroughly dispersed using a Vibra-Cell Ultrasonic Processor (Sonics and Materials, Inc.) standard probe at an amplitude of 30% for 10 minutes.

Forming the Water Swellable Layer:

After sonication, sodium dodecyl sulphate (0.07 g) was added to the dispersion which was then transferred to a 100 mL round bottom flask containing 4,4'-azobis(4-cyanovaleric acid) (V501) (0.04 g, 0.16 mmol). The flask was subsequently sealed and purged with nitrogen for 10 minutes. The whole flask was then immersed in an oil bath with a temperature setting of 70° C. and was magnetically stirred. After 5 minutes a 2% SDS solution (2 mL) was injected into the flask at a rate of 2 mL/hour. At the same time, a deoxygenated 2:2:1 (weight ratio) solution (1.5 mL, 1.41 g) of methyl methacrylate (MMA), butyl acrylate (BA) and methacrylic acid (MA) was injected into the flask at a rate of 2 mL/hour.

Formation of the Extensible Polymer Layer:

After 60 minutes of heating, a deoxygenated monomer solution (5 mL, 4.69 g) of MMA (4.26 g, 42.6 mmol) and butyl acrylate (0.043 g, 3.3 mmol) was added to the flask at a rate of 2.5 mL/hour while the temperature was maintained at 70° C. A 2% SDS solution (4 mL) was also injected into the flask at a rate of 2 mL/hour. Upon completion of this monomer addition, the temperature of the oil bath was maintained at 70° C. for another 1 hour. A deoxygenated styrene solution (7.5 mL, 6.79 g, 65.2 mmol) was then injected to the flask at 2.5 mL/hour while the heating was continued for another 15 hours to yield a white and stable latex.

A thermogravimetric measurement (Hi-Res TGA 2950 Thermogravimetric Analyzer, TA instruments) showed that the encapsulated pigment particles contained 48.1% polymer. By TGA, it was found that 62.8% of total polymers were in encapsulating polymer shell while 37.2% of polymers still remained in the aqueous phase.

Swelling the Swellable Polymer Layer:

To this latex (10 g), water (10 g) was added and the pH was adjusted to 11 with ammonium hydroxide (28%). The latex was transferred to a round bottom flask which was subsequently sealed and magnetically stirred in a 95° C. oil bath for 2 hours.

The polymer encapsulated particulate material in the resulting latex was allowed to dry and then analysed by TEM. The resulting TEM image clearly showed a void region that had been formed in between the particulate material and the extensible polymer layer. A thermogravimetric measurement (Hi-Res TGA 2950 Thermogravimetric Analyzer, TA instruments) showed that the voided particles contained 41.6% polymer. Particle sizing performed on Zetasizer (Malvern Instruments) showed the final latex contained particles with an average diameter of 652 nm.

Example 14

Preparation of Water Swellable Polymer Encapsulated Particulate Material Using the Orotan 731A (DOW)

Dispensing the Particulate Material:

In a 100 ml beaker, Orotan 731A copolymer solution (0.6 g) was dispersed in water (50.4 g). Hydrochloric acid solution (1%) was added to the polymer solution to lower the pH to 7.5. Titanium dioxide (Tioxide TR92, Huntsman) (10.0 g) was added to the solution and thoroughly dispersed using a Vibra-Cell Ultrasonic Processor (Sonics and Materials, Inc.) standard probe at an amplitude of 30% for 10 minutes.

Forming the Water Swellable Layer:

After sonication, sodium dodecyl sulphate (0.07 g) was added to the dispersion which was then transferred to a 100 mL round bottom flask containing 4,4'-azobis(4-cyanovaleric acid) (V501) (0.04 g, 0.17 mmol). The flask was subsequently sealed and purged with nitrogen for 10 minutes. The whole flask was then immersed in an oil bath at a temperature setting of 70° C. and was magnetically stirred. After 5 minutes a 2% SDS solution (1 mL) was injected into the flask at a rate of 2 mL/hour. At the same time, a deoxygenated 2:2:1 (weight ratio) solution (0.75 mL, 0.7 g) of methyl methacrylate (MMA), butyl acrylate (BA) and methacrylic acid (MA) was injected into the flask at a rate of 2 mL/hour.

Formation of the Extensible Polymer Layer:

After 120 minutes at 70° C. a deoxygenated monomer solution (2.5 mL, 2.35 g) of MMA (2.13 g, 21.3 mmol) and butyl acrylate (0.0.21 g, 1.7 mmol) was then added to the flask at a rate of 2.5 mL/hour while the temperature was maintained at 70° C. A 2% SDS solution (2 mL) was also injected into the flask at a rate of 2 mL/hour. Upon completion of this monomer addition, the temperature of the oil bath was maintained at 70° C. for another 1 hour. A deoxygenated styrene solution (5 mL, 4.53 g, 43.5 mmol) was then injected to the flask at 2.5 mL/hour while the heating was continued for another 14 hours to yield a white and stable latex.

A thermogravimetric measurement (Hi-Res TGA 2950 Thermogravimetric Analyzer, TA instruments) showed that the encapsulated pigment particles contained 41.5% polymer. By TGA, it was found that 80% of total polymer was in the encapsulating polymer shell while 20% of the polymer still remained in the aqueous phase.

Swelling the Swellable Polymer Layer:

To this latex (10 g), water (10 g) was added and the pH was adjusted to 11 with ammonium hydroxide (28%). The latex was transferred to a round bottom flask which was subsequently sealed and magnetically stirred in a 95° C. oil bath for 2 hours.

The polymer encapsulated particulate material in the resulting latex was allowed to dry and then analysed by TEM. The resulting TEM image clearly showed a void region that had been formed in between the particulate material and the extensible polymer layer. A thermogravimetric measurement (Hi-Res TGA 2950 Thermogravimetric Analyzer, TA instruments) showed that the voided particles contained 34.9% polymer. Particle sizing Performed on Zetasizer (Malvern Instruments) showed the final latex contained particles with an average diameter of 538 nm.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of preparing an aqueous dispersion of polymer encapsulated particulate material, the method comprising:
    providing a dispersion of the particulate material in a continuous aqueous phase, the dispersion comprising ethylenically unsaturated monomer and a stabiliser for the particulate material, wherein the stabiliser is adsorbed onto the outermost surface of the particulate material; and
    polymerising the ethylenically unsaturated monomer by non-living free radical polymerisation to form polymer that encapsulates the particulate material, thereby providing the aqueous dispersion of polymer encapsulated particulate material;
    wherein polymerisation of the ethylenically unsaturated monomer comprises:
    (a) polymerising a monomer composition that includes ionisable ethylenically unsaturated monomer so as to form a base responsive water swellable non-living polymer layer that encapsulates the particulate material; and
    (b) polymerising a monomer composition that includes non-ionisable ethylenically unsaturated monomer so as to form an extensible, water and base permeable non-living polymer layer that encapsulates the base responsive water swellable polymer layer; and
    exposing the resulting polymer encapsulated particulate material to a basic aqueous environment such that the base responsive water swellable polymer layer swells and expands in volume, while at the same time the extensible, water and base permeable polymer layer stretches to accommodate within its confines the expanded volume of the swollen base responsive water swellable polymer layer.

2. The method according to claim 1, wherein the monomer composition that is polymerised to form the water swellable non-living polymer layer comprises from about 10 wt % to about 40 wt % ionisable ethylenically unsaturated monomer.

3. The method according to claim 1, wherein the monomer composition that is polymerised to form the water swellable non-living polymer layer comprises methyl methacrylate (MMA), butyl acrylate (BA) and methacrylic acid (MA) and/or acrylic acid (AA).

4. The method according to claim 1, wherein the monomer composition that is polymerised to form the extensible, water and base permeable non-living polymer layer comprises greater than about 70 wt % of non-ionisable hydrophobic ethylenically unsaturated monomer.

5. The method according to claim 1, wherein the monomer composition that is polymerised to form the extensible, water and base permeable non-living polymer layer comprises styrene, methyl methacrylate and butyl acrylate.

6. The method according to claim 1, wherein the basic aqueous environment comprises one or more of an alkali metal base, ammonium hydroxide, alkaline earth metal base or an aliphatic amine.

7. The method according to claim 1 further comprising crosslinking the stretched extensible, water and base permeable polymer layer.

8. The method according to claim 1 further comprising removing from the polymer encapsulated particulate material water within the swollen base responsive water swellable polymer layer, the effect of which causes the volume of that layer to be reduced, wherein the extensible, water and base permeable polymer layer remains in a stretched state so as to provide one or more voids in between the particulate material and the stretched extensible, water and base permeable polymer layer.

9. A method of preparing a paint, filler, adhesive, liquid ink, primer or sealant product comprising preparing an aqueous dispersion of polymer encapsulated particulate material according to claim 1, and combining the dispersion with one or more formulation components.

* * * * *